United States Patent
Yang et al.

(10) Patent No.: US 12,273,908 B2
(45) Date of Patent: Apr. 8, 2025

(54) PARTIAL TRANSMISSION TO SUPPORT EXTENDED REALITY (XR) TRAFFIC

(71) Applicant: Apple Inc., Cupertino, CA (US)

(72) Inventors: Weidong Yang, San Diego, CA (US); Chunxuan Ye, San Diego, CA (US); Dawei Zhang, Saratoga, CA (US); Fangli Xu, Beijing (CN); Haijing Hu, Los Gatos, CA (US); Haitong Sun, Cupertino, CA (US); Hong He, San Jose, CA (US); Huaning Niu, San Jose, CA (US); Oghenekome Oteri, San Diego, CA (US); Ralf Rossbach, Munich (DE); Sigen Ye, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/756,855

(22) PCT Filed: Jun. 7, 2021

(86) PCT No.: PCT/CN2021/098704
§ 371 (c)(1),
(2) Date: Jun. 3, 2022

(87) PCT Pub. No.: WO2022/256987
PCT Pub. Date: Dec. 15, 2022

(65) Prior Publication Data
US 2024/0196424 A1   Jun. 13, 2024

(51) Int. Cl.
*H04W 72/543*   (2023.01)
*H04L 1/00*   (2006.01)
(Continued)

(52) U.S. Cl.
CPC ......... *H04W 72/543* (2023.01); *H04L 1/0061* (2013.01); *H04L 1/1819* (2013.01); *H04L 1/1861* (2013.01)

(58) Field of Classification Search
CPC .. H04W 72/543; H04L 1/0061; H04L 1/1819; H04L 1/1861; H04L 1/1877
See application file for complete search history.

(56) References Cited

U.S. PATENT DOCUMENTS

2019/0356420 A1\* 11/2019 John Wilson ........ H04B 7/0408
2019/0357078 A1\* 11/2019 Akkarakaran ........ H04L 1/1829
(Continued)

FOREIGN PATENT DOCUMENTS

| CN | 108631988 | 10/2018 |
|---|---|---|
| WO | 2021/035231 | 2/2021 |
| WO | 2021/072658 | 4/2021 |

OTHER PUBLICATIONS

Samsung, "Discussion on partial retransmission for eMBB", 3GPP TSG RAN WG1 Meeting NR#1, Jan. 16-20, 2017, R1-1700959, 4 sheets.

*Primary Examiner* — Kibrom T Hailu
(74) *Attorney, Agent, or Firm* — Fay Kaplun & Marcin, LLP

(57) ABSTRACT

A transmitting device is configured to transmit, to a second device, a medium access control (MAC) protocol data unit (PDU) comprising a plurality of MAC subPDUs, each MAC subPDU comprising at least one of a subheader, a MAC service data unit (SDU) or a MAC control element (CE), receive, from the second device, feedback indicating that the MAC PDU was received incorrectly, determine that a partial transmission scheme criteria is satisfied, transmit, to the second device, an indication that the partial transmission
(Continued)

scheme is to be used to retransmit the MAC PDU and retransmit, to the second device, the MAC PDU using the partial transmission scheme.

19 Claims, 14 Drawing Sheets

(51) Int. Cl.
*H04L 1/1812* (2023.01)
*H04L 1/1829* (2023.01)

(56) References Cited

U.S. PATENT DOCUMENTS

| | | |
|---|---|---|
| 2020/0221310 A1 | 7/2020 | Babaei et al. |
| 2024/0072938 A1* | 2/2024 | Zhang ................ H04W 72/232 |

* cited by examiner

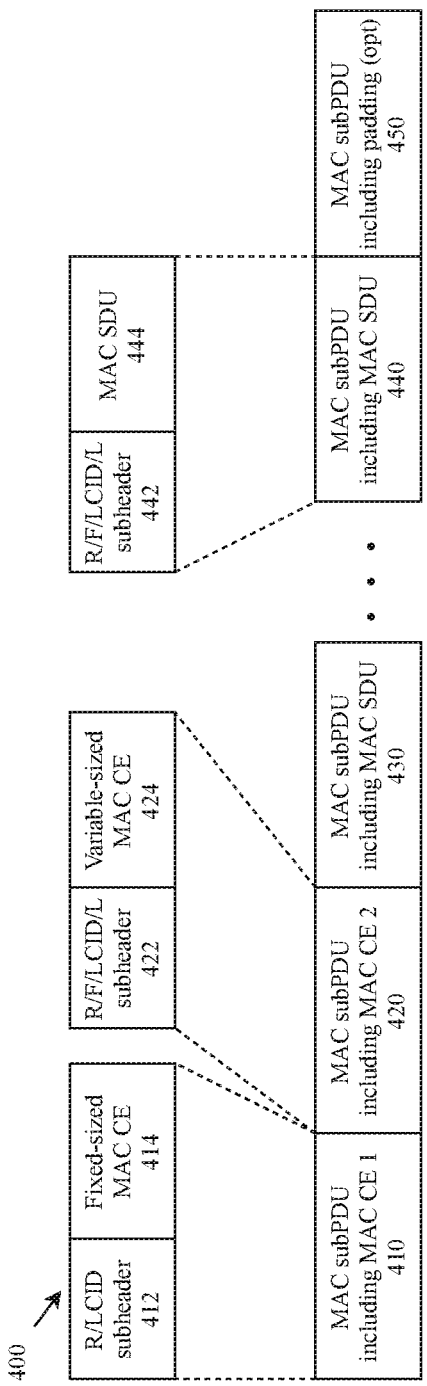
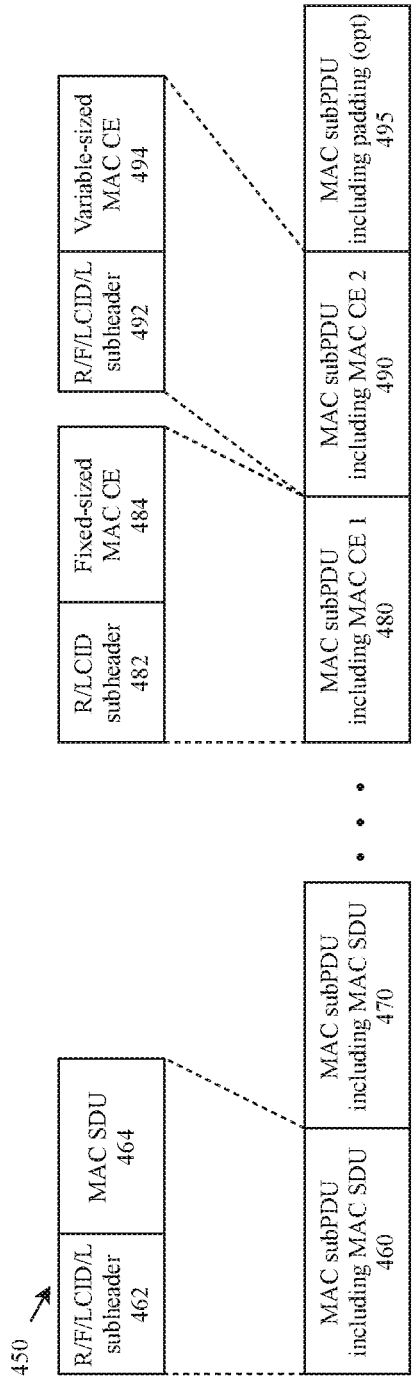
Fig. 4A
Fig. 4B

PARTIAL TRANSMISSION TO SUPPORT EXTENDED REALITY (XR) TRAFFIC

TECHNICAL FIELD

This application relates generally to wireless communication, and in particular relates to Partial Transmission to Support Extended Reality (XR) Traffic.

BACKGROUND 5G new radio (NR) wireless communication networks may support Extended Reality (XR), which is a generic concept that encompasses all immersive technologies. XR may generally refer to real-and-virtual combined environments and associated human-machine interactions generated by computer technology and wearables. To provide some examples, the term XR may encompass augmented reality (AR), mixed reality (MR) and virtual reality (VR). With XR services, there may be multiple data flows on either the downlink (DL) or the uplink (UL). For example, the data flows may include video streams and audio/data streams in the DL and UL, and pose/control streams in the UL. Each stream may be associated with different Quality of Service (QoS) requirements including reliability and latency requirements.

In NR, overlapping simultaneous unicast transmissions on the same component carrier (CC) is not supported. If Physical Downlink Shared Channel (PDSCH) and Physical Uplink Shared Channel (PUSCH) for different data flows have to be sent in a time division multiplexing (TDM) fashion, latency can be long and the user equipment (UE) power use may be high. One solution is to multiplex multiple Medium Access Control (MAC) Service Data Units (SDUs) on the same MAC Protocol Data Unit (PDU).

However, there are issues associated with multiplexing MAC SDUs on the same MAC PDU. For example, in the case that there is a PDSCH/PUSCH error during the reception or transmission of the associated transport block, Hybrid Automatic Repeat Request (HARQ) retransmissions may be used. If the data flows of the MAC SDUs multiplexed in the MAC PDU have similar latency budgets, then HARQ retransmission for the whole MAC PDU is a reasonable solution. However, when MAC SDUs have different latency budgets, retransmission for MAC SDUs with expired latency budgets may not lead to any better user experience and constitutes a waste of resources. In another case, if the transmitter does not have enough resources to transmit or retransmit over all the MAC SDUs, the receiver may not receive all the MAC SDUs correctly. The MAC SDUs with tighter delay budgets may be prevented from being utilized by the MAC layer due to the whole MAC PDU not being received correctly. Thus, there is a need to design efficient transmission schemes when multiple MAC SDUs having different QoS requirements are mapped to the same MAC PDU.

SUMMARY

Some exemplary embodiments are related to a processor of a first device configured to perform operations. The operations include transmitting, to a second device, a medium access control (MAC) protocol data unit (PDU) comprising a plurality of MAC subPDUs, each MAC subPDU comprising at least one of a subheader, a MAC service data unit (SDU) or a MAC control element (CE), receiving, from the second device, feedback indicating that the MAC PDU was received incorrectly, determining that a partial transmission scheme criteria is satisfied, transmitting, to the second device, an indication that the partial transmission scheme is to be used to retransmit the MAC PDU and retransmitting, to the second device, the MAC PDU using the partial transmission scheme.

Other exemplary embodiments are related to a processor of a first device configured to perform operations. The operations include receiving, from a second device, a medium access control (MAC) protocol data unit (PDU) comprising a plurality of MAC subPDUs, each MAC subPDU comprising at least one of a subheader, a MAC service data unit (SDU) or a MAC control element (CE), receiving, from the second device, an indication that the partial transmission scheme is to be used to retransmit the MAC PDU and receiving, from the second device, a retransmission of the MAC PDU according to the partial retransmission scheme.

Still further exemplary embodiments are related to a processor of a first device configured to perform operations. The operations include transmitting, to a second device, a transport block comprising a plurality of control block groups (CBGs), wherein the CBGs comprise a portion of one or more medium access control (MAC) sub Protocol Data Units (subPDUs) or MAC control element (CE), receiving, from the second device, feedback indicating that at least some of the CBGs of the TB were received incorrectly, determining that a flush criteria has been satisfied and transmitting, to the second device, a flush command indicating that one or more of the CBGs that were received correctly should be passed to an upper layer of the second device.

Additional exemplary embodiments are related to a processor of a first device configured to perform operations. The operations include receiving, from a second device, a transport block comprising a plurality of control block groups (CBGs), wherein the CBGs comprise a portion of one or more medium access control (MAC) sub Protocol Data Units (subPDUs) or MAC control element (CE), transmitting, from the second device, feedback indicating that at least some of the CBGs were received incorrectly and receiving, from the second device, a flush command indicating that any CBGs that were received correctly should be passed from a physical layer (PHY) of the first device to an upper layer of the first device.

BRIEF DESCRIPTION OF THE DRAWINGS

FIG. 4A shows an exemplary NR format for a downlink (DL) MAC PDU comprising multiple MAC SDUs according to various exemplary embodiments.

FIG. 4B shows an exemplary NR format for an uplink (UL) MAC PDU comprising multiple MAC SDUs according to various exemplary embodiments.

DETAILED DESCRIPTION

Figure 1:
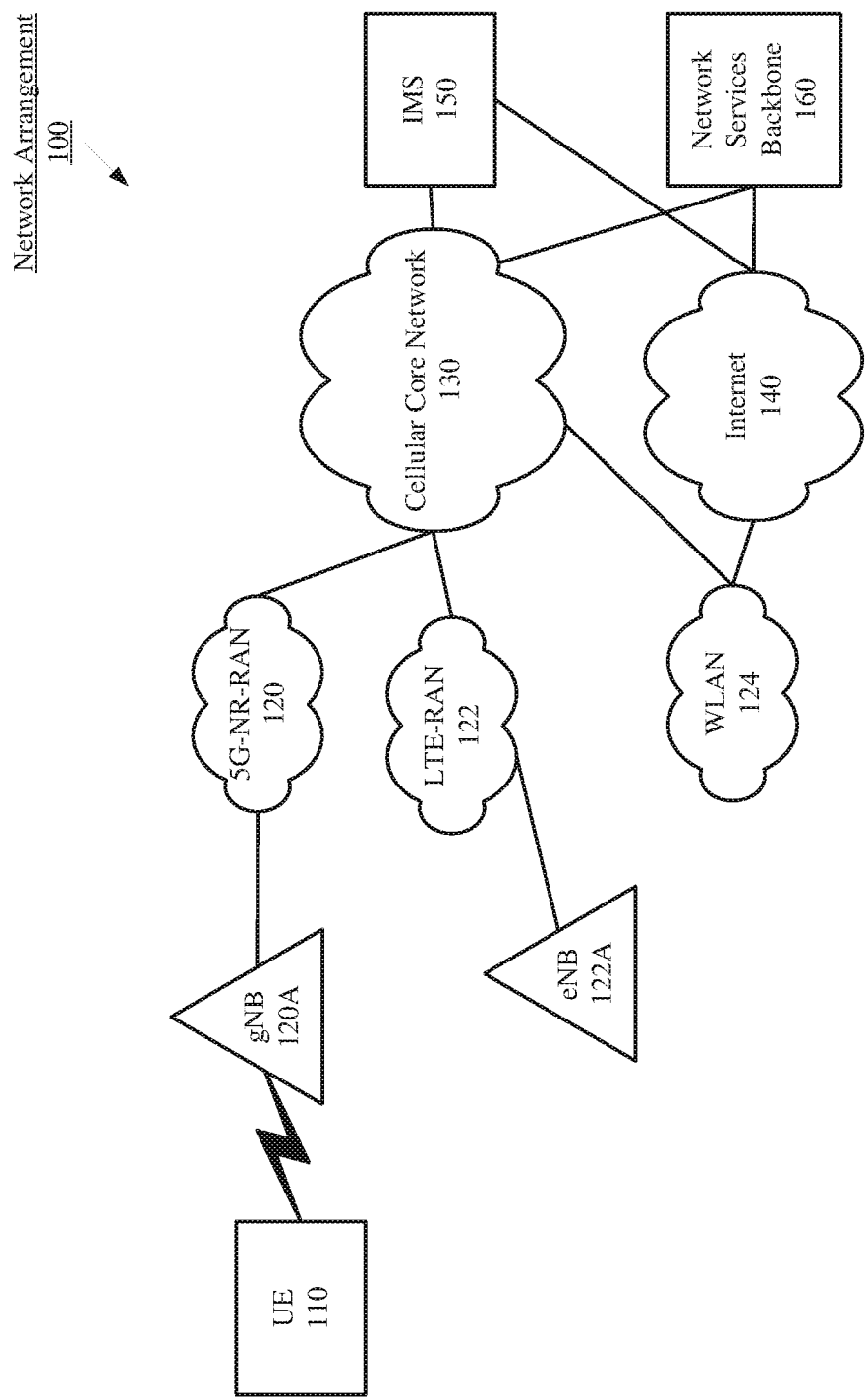
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe various methods for retransmitting Medium Access Control (MAC) Protocol Data Units (PDU) that include multiple MAC Service Data Units (SDUs).

The exemplary embodiments are described with regard to a network that includes 5G new radio NR radio access technology (RAT). However, the exemplary embodiments may be implemented in other types of networks using the principles described herein. For example, the exemplary embodiments are described with respect to a Medium Access Control (MAC) Protocol Data Unit (PDU) that is formatted for 5G NR networks. However, as will be described in greater detail below, the exemplary embodiments are also described with respect to MAC PDUs that are formatted for Long Term Evolution (LTE) networks. Thus, from these examples, it should be understood that the exemplary embodiments may be modified to apply to networks having any type of MAC PDU format.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

In addition, the exemplary embodiments are described with respect to multiple MAC SDUs having different QoS requirements that are mapped to the same MAC PDU. In the exemplary embodiments, the QoS requirement is described as a latency requirement. However, it should be understood that the exemplary embodiments may apply to any type of requirement for the MAC SDUS.

Throughout this description the terms "data flow" and "logical channel" channel are used interchangeably to describe streams that may be transmitted in the DL or UL. For example, the data flows/logical channels may include video streams and audio/data streams in the DL and UL, and pose/control streams in the UL. Those skilled in the art will understand that in NR, higher layers can link a data flow to a QoS flow. Furthermore, multiple QoS flows may be mapped to the same data radio bearer (DRB) associated with a logical channel. In LTE, higher layers link a data flow to an Evolved Packet System (EPS) bearer and there is a 1:1 mapping between EPS bearers and DRBs/logical channels.

Throughout this description the term "retransmission" is used to describe subsequent transmissions of MAC PDUs after an initial transmission of the MAC PDU. It should be understood that the retransmissions are described as complete retransmissions where the complete MAC PDU is retransmitted or partial retransmissions where only a portion of the MAC PDU is retransmitted. However, these retransmissions may be HARQ retransmissions. Those skilled in the art will understand that HARQ retransmissions typically do not mean the retransmission of the MAC PDU or a portion of the MAC PDU on a bit by bit basis. Rather HARQ retransmissions typically refer to the transmission of data (e.g., parity bits and/or systematic bits) that may be combined with previously received data used to recover the originally transmitted data. Thus, when the term retransmission is used, it should be understood to encompass any type of retransmission including bit-by-bit retransmissions, HARQ retransmissions or any other type of retransmission that may be used to correctly receive the originally intended MAC PDU.

In addition, throughout this description, it will be described that MAC PDUs, MAC SDUs, transport blocks (TBs), code blocks (CBs) and/or code block groups (CBGs) are transmitted and received by devices within or connected to a wireless network. Those skilled in the art will understand that these terms refer to constructs within a network stack of the devices. For example, TBs, CBs and CBGs are associated with a Physical Layer (PHY) of the network stack and MAC PDUs and MAC SDUs are associated with the MAC layer of the network stack. It should be understood that throughout this description these terms are being used in their ordinary context, e.g., the PHY layer of a transmitter/receiver will perform operations related to PHY layer constructs and the MAC layer of the transmitter/receiver will perform operations related to MAC layer constructs.

The exemplary embodiments are described with regard to extended Reality (XR). As described above, XR is an umbrella term for different types of realities and may generally refer to real-and-virtual combined environments and associated human-machine interactions generated by computer technology and wearables. However, any reference to XR being specific to a particular use case or type of traffic is merely provided for illustrative purposes. The exemplary embodiments apply to any type of NR traffic that includes the characteristics of the traffic described herein.

According to some exemplary embodiments, a partial transmission scheme may be used to retransmit the MAC PDUs. The partial transmission scheme may allow the receiver to avoid receiving MAC SDUs that are no longer relevant, thereby saving processing and power resources, and reducing resource consumption in the network. The partial transmission scheme may be implemented based on the MAC PDU being divided into code block groups (CBGs) or may be implemented on a MAC subPDU basis. Each of these exemplary embodiments will be described in greater detail below.

According to other exemplary embodiments, a flush command may be implemented. When a receiver of the MAC PDU receives the flush command, the receiver will pass any correctly received CBGs to higher layer levels for further processing.

FIG. 1 shows an exemplary network arrangement 100 according to various exemplary embodiments. The exemplary network arrangement 100 includes a UE 110. It should be noted that any quantity of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. With regard to XR, in some configurations, the UE 110 may be paired with a wearable device (e.g., a head mounted display (HMD), AR glasses, etc.). In this type of configuration, the UE 110 may communicate directly with the network and then relay data to the wearable device which presents the XR content to the user (e.g., AR, VR, MR, etc.). In other configurations, the UE 110 may be a wearable device that communicates directly with the network and presents the XR content to the user. Therefore, the UE 110 as described herein is used to represent any electronic component that directly communicates with the network. It should also be understood that an actual network arrangement may include any quantity of UEs being used by any quantity of users. Thus, a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A. Further, the UE 110 may connect to the LTE-RAN 122 via the eNB 122A. Those skilled in the art will understand that any association procedure may be performed for the UE 110 to connect to the 5G NR-RAN 120 and/or the LTE-RAN 122. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
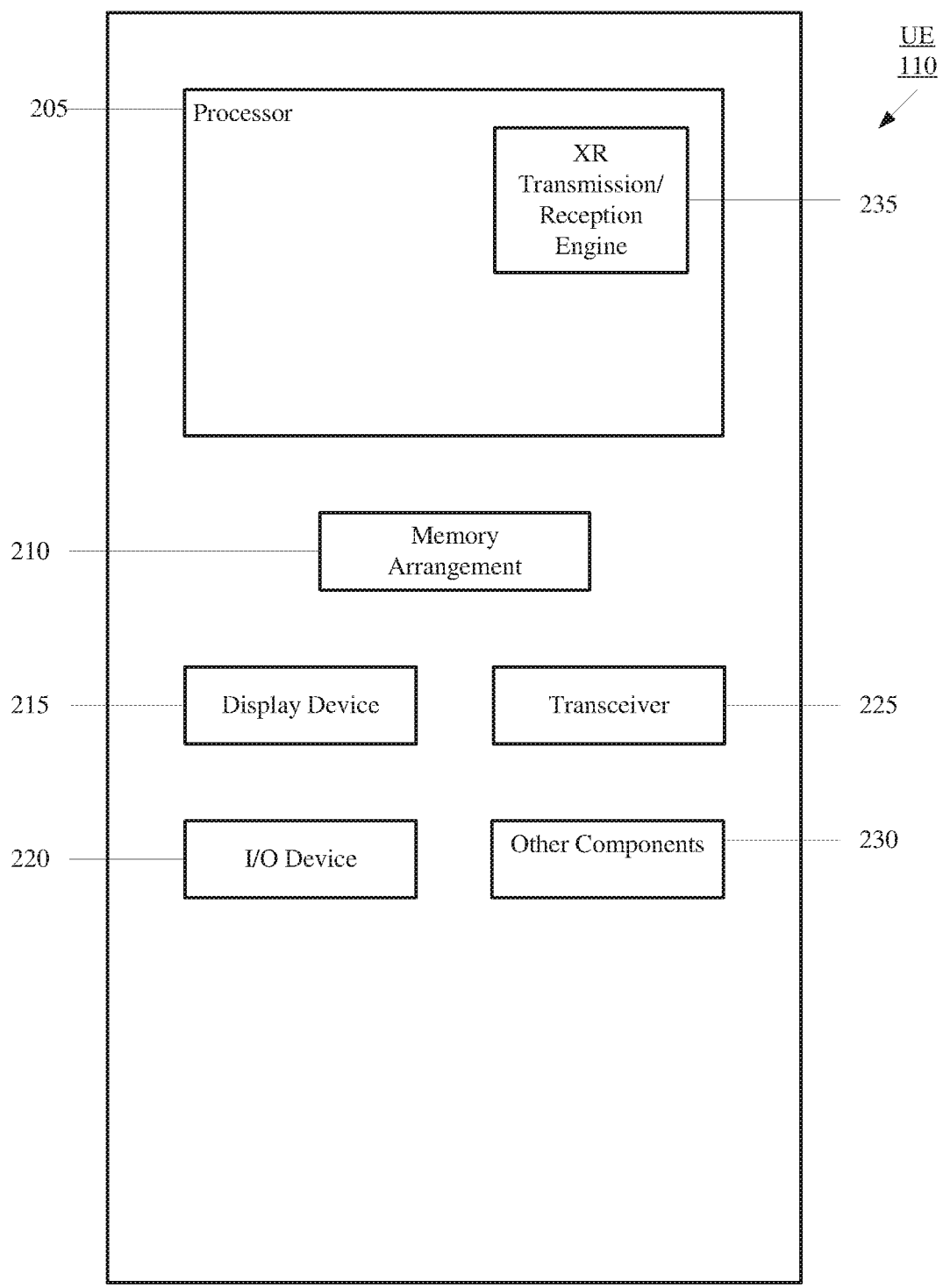
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include an XR transmission/reception engine 235. As will be described in more detail below, the XR transmission/reception engine 235 may perform various operations related to both the transmission in the uplink (UL) of XR traffic and reception of XR traffic in the downlink (DL).

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
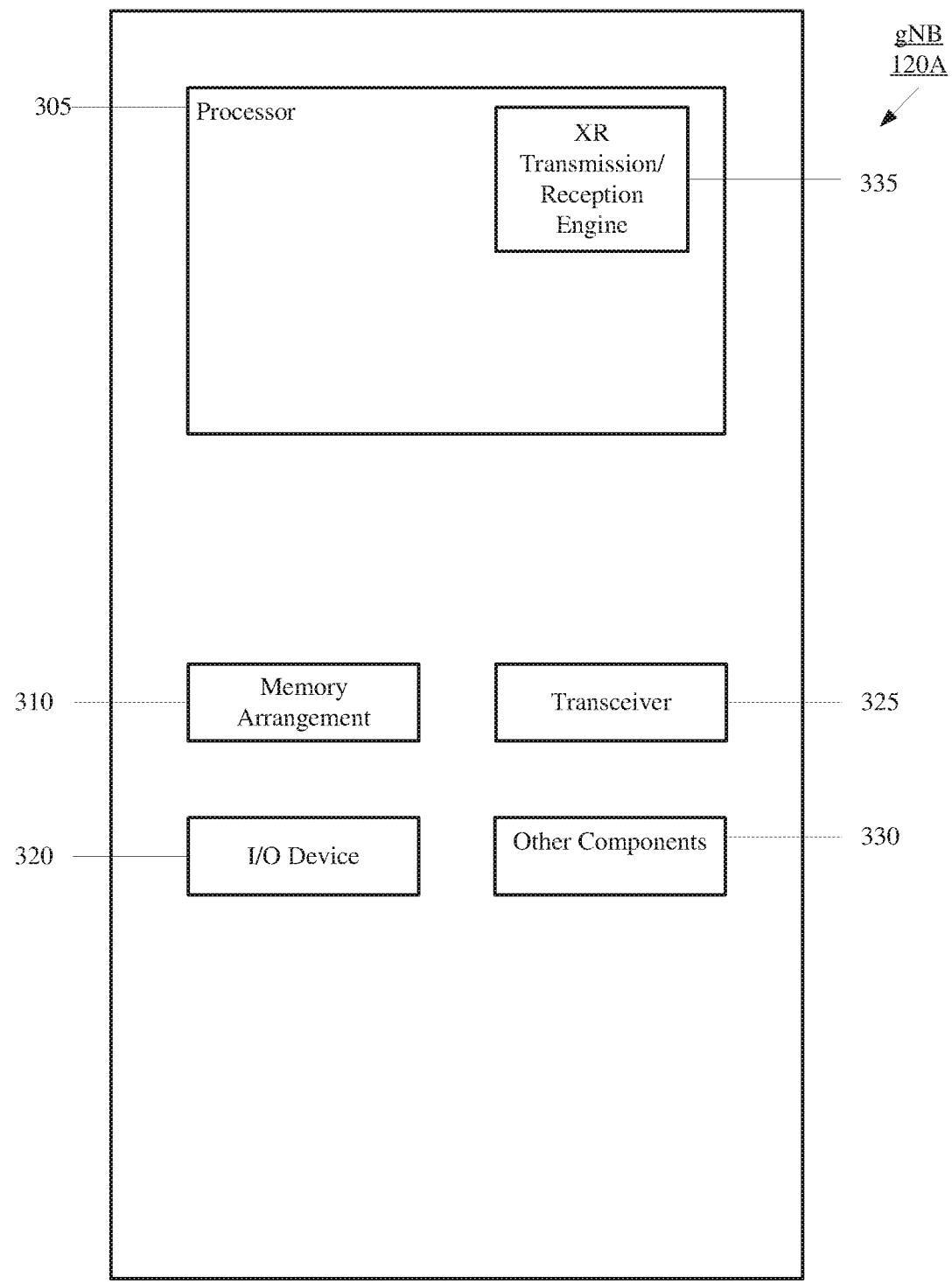
FIG. 3 shows an exemplary base station according to various exemplary embodiments.

FIG. 3 shows an exemplary network base station, in this case gNB 120A, according to various exemplary embodiments. As noted above with regard to the UE 110, the gNB 120A may represent a serving cell for the UE 110. The gNB 120A may represent any access node of the 5G NR network through which the UEs 110 may establish a connection and manage network operations.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include an XR transmission/reception engine 335. As will be described in more detail below, the XR transmission/reception engine 335 may perform various operations related to both the transmission in the DL of XR traffic and reception of XR traffic in the UL.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

FIG. 4A shows an exemplary NR format for a downlink (DL) MAC PDU 400 comprising multiple MAC SDUs according to various exemplary embodiments. The DL MAC PDU 400 includes a plurality of MAC subPDUs 410-450. The MAC subPDUs 410 and 420 include MAC Control Elements (CE). As shown, the MAC subPDU 410 comprises a R/LCID subheader 412 and a fixed size MAC CE 414. The MAC subPDU 420 comprises a R/F/LCID/L subheader 422 and a variable size MAC CE 424. The MAC subPDUs 430 and 440 include the multiplexed MAC SDUs. In this example, only the MAC subPDU 440 is shown with its constituent parts. The MAC subPDU 440 comprises a R/F/LCID/L subheader 442 and a MAC SDU 444. The DL MAC PDU 400 may also include MAC subPDUs 450 with padding.

In some exemplary embodiments, the MAC SDUs may be from different data flows, e.g., the MAC SDUs 430 and 440 are from different data flows. As described above, these different data slows may have different QOS requirements, e.g., latency budgets. However, it is not a requirement that the MAC PDU 400 include MAC SDUs from different data flows. For example, in some exemplary embodiments, the MAC CE (s) may be more or less latency sensitive than any or all of the MAC SDUS. Thus, the considerations on MAC SDUs with different latency requirements may also apply to MAC SDUs and MAC CEs.

FIG. 4B shows an exemplary NR format for an uplink (UL) MAC PDU 455 comprising multiple MAC SDUs according to various exemplary embodiments. The UL MAC PDU 455 includes a plurality of MAC subPDUs 460-495. The MAC subPDUs 460 and 470 include the multiplexed MAC SDUs. In this example, only the MAC subPDU 460 is shown with its constituent parts. The MAC subPDU 460 comprises a R/F/LCID/L subheader 462 and a MAC SDU 464. The MAC subPDU 480 comprises a R/LCID subheader 482 and a fixed size MAC CE 484. The MAC subPDU 490 comprises a R/F/LCID/L subheader 492 and a variable size MAC CE 494. The UL MAC PDU 455 may also include MAC subPDUs 495 with padding.

Comparing the DL MAC PDU 400 and the UL MAC PDU 455, it can be seen that each MAC PDU includes the same basic information. However, the order of the subPDUs is changed. In the DL MAC PDU 400, the MAC CE information comes first. Whereas in the UL MAC PDU 455, the MAC SDUs come first. Thus, all the considerations described above with respect to the DL MAC PDU 400, e.g., the latency requirements, etc., apply equally to the UL MAC PDU 455.

Figure 5:
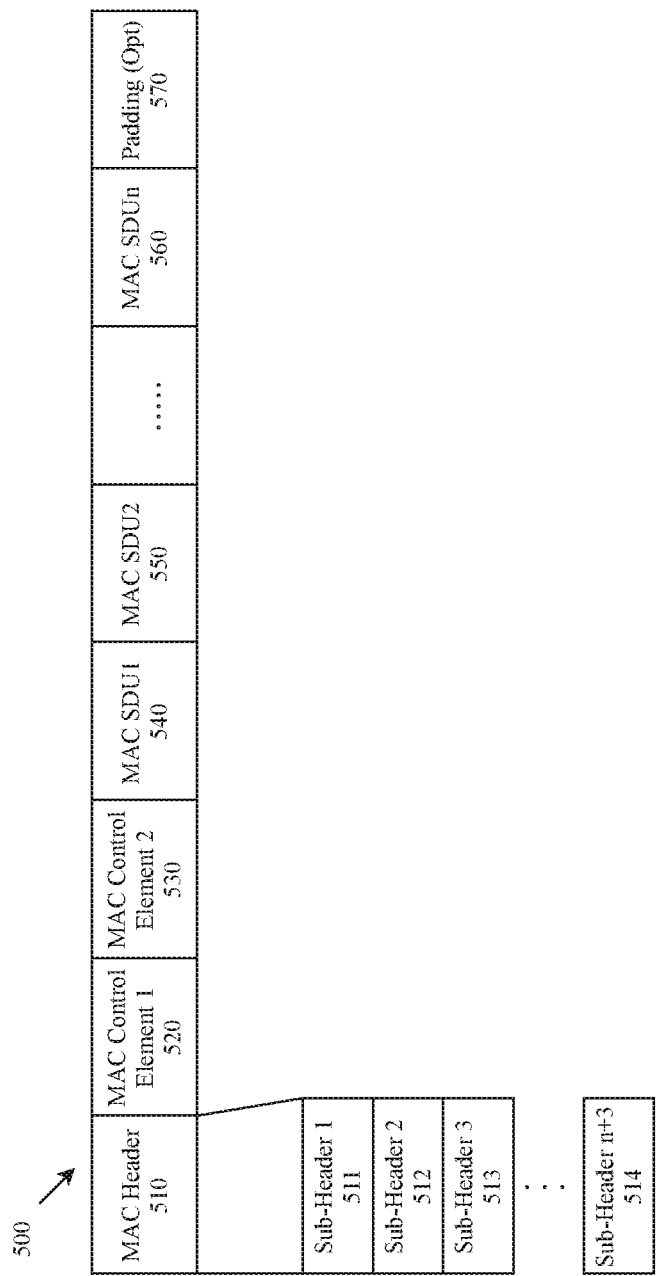
FIG. 5 shows an exemplary LTE format for a MAC PDU comprising multiple MAC SDUs according to various exemplary embodiments.

FIG. 5 shows an exemplary LTE format for a MAC PDU 500 comprising multiple MAC SDUs according to various exemplary embodiments. As described above, while the exemplary embodiments are described with reference to NR and LTE MAC PDU formats, it should be understood that these formats are only being used as examples. For example, it is possible that in the next generation of cellular networks (e.g., 6G networks), the MAC PDU format may resemble the LTE MAC PDU format rather than the NR MAC PDU format. Thus, it should be understood that the exemplary embodiments may be applied to any type of network using the principles described herein, including non-cellular networks (e.g., the WLAN 124).

The MAC PDU 500 comprises a MAC header 510 that comprises a plurality of MAC subheaders 511-514 corresponding to the number of CEs (e.g., MAC CEs 520, 530), SDUs (e.g., MAC SDUs 540-560) and padding (e.g., padding 570) that are included in the MAC PDU 500. In this example, the MAC PDU 500 comprises two MAC CEs 510 and 520, MAC SDUs 530-560 and padding 570. As described above, it may be considered that the MAC SDUS 530-560 are from at least two different data flows.

Comparing the MAC PDU 500 with the DL MAC PDU 400 and the UL MAC PDU 455, it can be seen that the MAC PDU 500 includes all the subheader information for each of the components of the MAC PDU in the beginning of the MAC PDU. In contrast, the DL MAC PDU 400 and the UL MAC PDU 455 include subheader information for each component of the PDU in the individual subPDU of each component. As will be described in greater detail below, these differences may impact the partial transmission schemes described herein.

As described above, in the case that there is a PDSCH/PUSCH error when transmitting the MAC PDUS, HARQ retransmissions may be used. When MAC SDUs and/or MAC CEs have different latency budgets, retransmission may not lead to any better user experience and may constitute a waste of resources. Referring to FIG. 4A to provide an example, it may be considered that the DL MAC PDU 400 is transmitted on the PDSCH from the gNB 120A to the UE 110. In this example, it may be considered that the MAC SDU 430 may be for a first logical channel and the MAC SDU 440 may be for a second logical channel. The first logical channel may have a first latency requirement and the second logical channel may have a second latency requirement. In this example, it may be considered that the latency requirement for the first logical channel is shorter than the latency requirement for the second logical channel. Also, as described above, the DL MAC PDU 400 transmitted on the PDSCH may experience an error and thus a HARQ retransmission may be used for the DL MAC PDU 400. However, the time of the HARQ retransmission may be after the latency requirement for the first logical channel (MAC SDU 430) has expired. Thus, retransmitting the entire DL MAC PDU 400 does not make any sense because the UE 110 will not use the MAC SDU 430 because it is too late but the UE 110 will still have to receive and process the DL MAC PDU 400 in its entirety. In addition, the retransmission of the entire DL MAC PDU 400 will use resources that may be used for other transmissions. Some exemplary embodiments are directed to partial transmission schemes where the entirety of failed PDUs do not need to be retransmitted (e.g., in the above scenario, only a portion of the DL MAC PDU 400 may be retransmitted).

Figure 12:
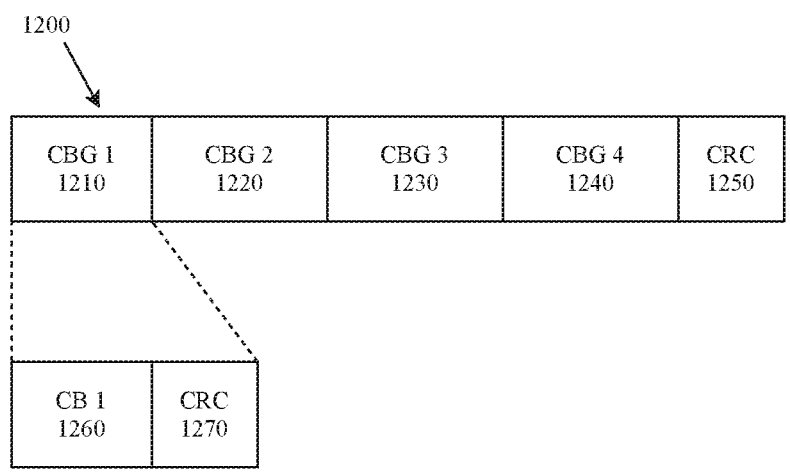
FIG. 12 shows an exemplary transport block (TB) that has been divided into multiple code block groups according to various exemplary embodiments.

In some exemplary embodiments, the transport block that includes the MAC PDU may be divided into code block groups. The use of the code block groups for the transport block that includes the MAC PDU may be used to support a partial transmission scheme. FIG. 12 shows an exemplary transport block (TB) 1200 that has been divided into multiple code block groups according to various exemplary embodiments. In some exemplary embodiments, the TB 1200 may be divided into multiple code blocks (CBs), e.g., 16 CBs. The 16 CBs may then be grouped into four (4) CBGs, e.g., four (4) CBs per CBG. However, it should be understood that this division is only an example. For example, in some exemplary embodiments, a CBG may comprise a single code block. Thus, the exemplary embodiments may apply to CBGs that include one or more CBS.

In the example of FIG. 12, the TB 1200 has been divided into four CBGs 1210-1240. In addition, the TB 1200 includes a CRC 1250. While not shown in FIG. 12, when the TB 1200 is divided into multiple CBGs, the CRC 1250 for the overall TB 1200 will be considered as part of the data of one of the CBGs. In legacy operations, when a receiver receives the TB 1200, the receiver will check the CRC 1250 and if it the CRC check passes, the TB 1200 may be passed to higher level layers for further processing. If the CRC check fails, the entire TB is considered to have failed and the TB 1200 will not be passed to the higher level layers for further processing. As will be described in greater detail below, the partial transmission scheme of the exemplary embodiments will allow a portion of the TB 1200 (e.g., one or more of the CBGs 1210-1240) to be passed to the higher level layers for further processing.

Continuing with the example of FIG. 12, the CBG 1 1210 is shown as including a CB 1260 and a CRC 1270. Thus, in this example, the CBG 1 1210 includes a single CB 1260A. The CRC 1270 is for the CB 1260. Thus, in examples where the CBGs include multiple CBs, each of the multiple CBs will include its own CRC. In these examples, the CBG CRC status may be defined as the AND of the CB CRC status for all the CBs in a CBG. For example, if a CBG comprises 4 CBs and each CB has its own CB-CRC, then if the CB-CRC checking passes for all 4 CBs, the CBG CRC status is considered to pass. If any of the CB-CRC checking does not pass for any CB in the CBG, then the CBG is considered to not have passed the CRC check. Under these scenarios, it should be understood that the CBG CRC status is equivalent to the CBG HARQ-ACK status.

The following examples will be described with respect to MAC PDUs that have the NR format (e.g., FIGS. 4A and 4B) and the LTE format (FIG. 5).

Figures 6A, 6B:
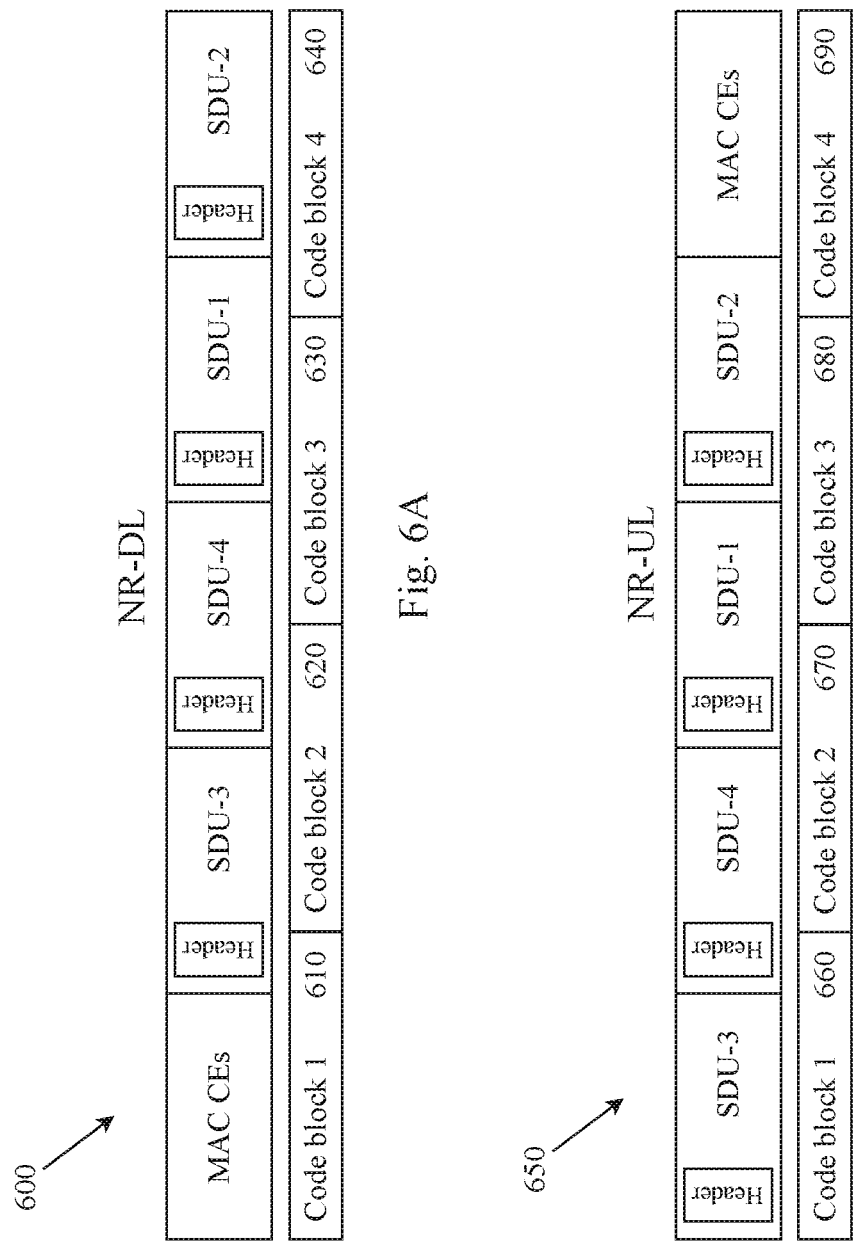
FIG. 6A shows an exemplary NR format for an DL MAC PDU comprising multiple MAC SDUs and divided into a plurality of code blocks according to various exemplary embodiments.
FIG. 6B shows an exemplary NR format for a UL MAC PDU comprising multiple MAC SDUs and divided into a plurality of code blocks according to various exemplary embodiments.

FIG. 6A shows an exemplary NR format for a DL MAC PDU 600 comprising multiple MAC SDUs and divided into a plurality of code blocks according to various exemplary embodiments. The DL MAC PDU 600 may be considered to be similar to the DL MAC PDU 400 described above with reference to FIG. 4A and therefore will not be described again for purposes of brevity.

As shown in FIG. 6A, the DL MAC PDU 600 has been divided into four code block groups 610-640. As can be seen in FIG. 6A, the code block groups may encompass more than one subPDU. For example, code block 610 includes the MAC CE subPDUs and a portion of the first MAC subPDU that includes a first MAC SDU, code block 620 includes the remaining portion of the first MAC SDU and a portion of the second MAC SDU, etc. The use of the code blocks for the partial transmission scheme will be described in greater detail below.

In some exemplary embodiments, if the MAC CEs or the new MAC subheader (to be described in greater detail below) are contained in the first code block, the first code block may not be the same size as the rest of code blocks. Moreover, because the information in the MAC CE or the new MAC subheader may be used for the purposes of the partial transmission scheme, better protection (e.g., more robust encoding) may be provided for that code block to ensure the receiver (e.g., the UE 110 in this example) successfully receives the first code block.

FIG. 6B shows an exemplary NR format for a UL MAC PDU 650 comprising multiple MAC SDUs and divided into a plurality of code blocks according to various exemplary embodiments. The UL MAC PDU 650 may be considered to be similar to the UL MAC PDU 455 described above with reference to FIG. 4B and therefore will not be described again for purposes of brevity.

As shown in FIG. 6B, the UL MAC PDU 650 has been divided into four code block groups 660-690. As can be seen in FIG. 6B, the code block groups may encompass more than one subPDU. For example, code block 660 includes the first MAC subPDU that includes a first MAC SDU and a portion of a second MAC SDU, code block 670 includes the remaining portion of the second MAC SDU and a portion of the third MAC SDU, etc. The use of the code blocks for the partial transmission scheme will be described in greater detail below.

The following description will provide exemplary embodiments for a partial transmission scheme for the DL MAC PDU 600. In the exemplary embodiments, it will be considered that the gNB 120A will be transmitting the DL MAC PDU 600 to the UE 110, e.g., the gNB 120A is the transmitting device and the UE 110 is the receiving device. However, it should be understood that the described exemplary embodiments may also be applied to the UL MAC PDU 650, e.g., the UE 110 is the transmitting device and the gNB 120A is the receiving device.

In current NR standards, the physical layer (PHY) of the receiving device (e.g., the UE 110) will not deliver the TB including the DL MAC PDU 600 to the MAC layer of the UE 110 unless the cyclic redundancy check (CRC) passes for the entire transport block (TB), e.g., the CRC 1250 passes for the entire TB 1200 of FIG. 12. This is true even if the individual CRCs for all the individual code blocks pass. In the exemplary embodiments, this operation may be modified to allow the PHY to pass some or all of the CBGs of a TB to the MAC when the CRC passes for the code blocks in the relevant CBGs. Example conditions for allowing the PHY to pass the CBGs to the MAC will be described in greater detail below.

Thus, regular CBG operation comprises the PHY delivering the decoding result to the upper layer (e.g., MAC layer) when all the CBs CRC checking and TB CRC checking pass. Partial CBG operation comprises the PHY delivering the decoding result to the upper layer when the CRC check passes for all CBs in relevant CBGs. The TB CRC can be checked also as long as it is calculated for the relevant CBGs only. In some exemplary embodiments, the TB CRC may be ignored. The relevant CBGs will be described in greater detail below.

Prior to describing the partial transmission scheme, the following will described a new MAC subheader that may be introduced to assist in implementing the partial transmission scheme. However, as will be described in greater detail below, the partial transmission scheme may be implemented with or without the use of the new MAC subheader. For the NR MAC PDU (e.g., DL MAC PDU 400 or UL MAC PDU 455), MAC subPDUs (SDU and its MAC subheader) are concatenated one by one. Thus, sequential examination is used to parse the MAC subPDUs, e.g., it is not possible to skip the processing of an early MAC subPDU and directly jump to a later MAC subPDU, as the composition/size of MAC subPDUs coming before the MAC subPDU of interest, e.g., the MAC subPDU that was not received correctly, is not known.

Thus, the new MAC subheader may be introduced to indicate MAC subPDU sizes. The proposed new MAC sub-header (s), when inserted judiciously, e.g., at the beginning of the MAC PDU, may allow the receiver to parse the subheader to derive information to identify where a MAC SDU starts. In this manner, missing subPDUs will not pose any problem when later MAC subPDUs are read. In some exemplary embodiments, the new MAC subheader has a fixed size allowing the current NR frame structure to remain. The following provides various examples of the new MAC subheader.

Figure 11A:
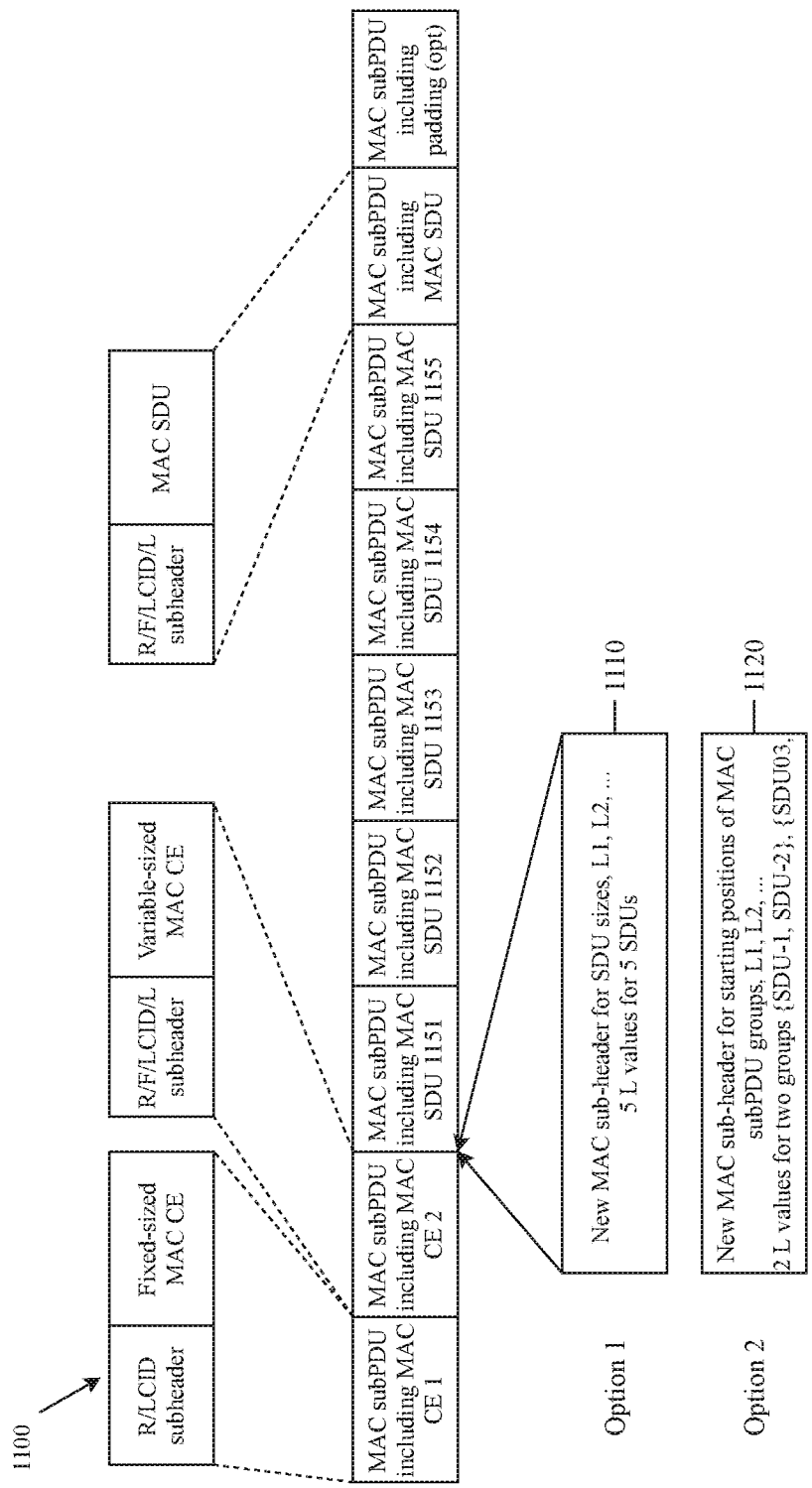
FIG. 11A shows an exemplary embodiment of a DL MAC PDU with a new MAC subheader according to various exemplary embodiments.

FIG. 11A shows an exemplary embodiment of a DL MAC PDU 1100 with a new MAC subheader according to various exemplary embodiments. The upper portion of the DL MAC PDU 1100 is similar to the DL MAC PDU 400 described with respect to FIG. 4A. Thus, it will not be further described for the sake of brevity, except to note that the DL MAC PDU 1100 includes five (5) MAC SDUs 1101-1105.

FIG. 11A shows the new MAC subheader 1110 or 1120 that is inserted in the DL MAC PDU 1100 after the MAC subPDUs for the CE and before the MAC subPDUs for the SDUs as shown by the arrows. The difference between the MAC subheader 1110 and the MAC subheader 1120 will be described below. As described above, the new MAC subheader 1110 or 1120 includes the length of the MAC subPDUs or the MAC SDUS.

In some exemplary embodiments, the new MAC subheader 1110 includes the individual length of the SDUs that are included in the DL MAC PDU 1100. In this example, the DL MAC PDU 1100 includes five (5) SDUs, thus the new MAC subheader 1110 includes 5 lengths for the 5 MAC subPDUs. If the new MAC subheader 1110 has a fixed size, then up to a predetermined number (M) of MAC subPDU or MAC SDU lengths can be included in the new MAC subheader 1110.

In other exemplary embodiments, the new MAC subheader 1120 may not indicate the length of each MAC subPDU, but rather indicate a starting position of each MAC subPDU group in the DL MAC PDU 1100. In the example of the new MAC subheader 1120, two starting positions are indicated, one for SDU-1 and another for SDU-3. Thus, this assumes that SDU-1 and SDU-2 have a same length and SDU-3, SDU-4 and SDU-5 have a same length.

Figure 11B:
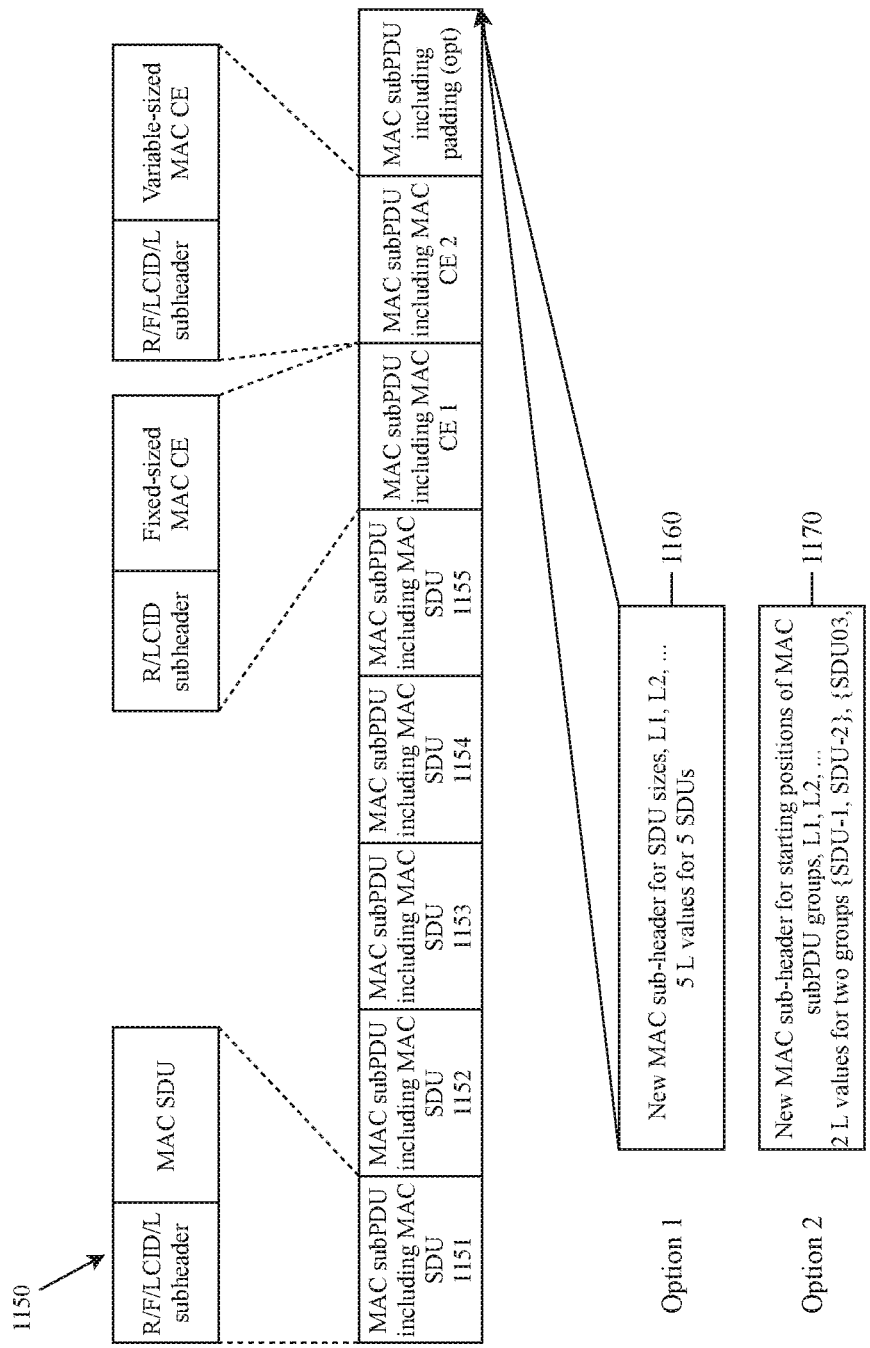
FIG. 11B shows an exemplary embodiment of a UL MAC PDU with a new MAC subheader according to various exemplary embodiments.

FIG. 11B shows an exemplary embodiment of a UL MAC PDU 1150 with a new MAC subheader according to various exemplary embodiments. The upper portion of the UL MAC PDU 1150 is similar to the UL MAC PDU 55 described with respect to FIG. 4A. Thus, it will not be further described for the sake of brevity, except to note that the UL MAC PDU 1150 includes five (5) MAC SDUs 1151-1155.

FIG. 11B shows the new MAC subheader 1160 or 1170 that is inserted in the UL MAC PDU 1150 after the MAC subPDUs including the padding. The difference between the MAC subheader 1160 and the MAC subheader 1170 is the same as described above with respect to the MAC subheader 1110 and the MAC subheader 1120, respectively. Specifically, the new MAC subheader 1160 includes the individual length of the SDUs that are included in the UL MAC PDU 1150, while the new MAC subheader 1170 may not indicate the length of each MAC subPDU, but rather indicate a starting position of each MAC subPDU group in the UL MAC PDU 1150.

In some exemplary embodiments, a MAC PDU may include multiple of new MAC subheaders. For example, the new subheader may be placed at the beginning, at the end, at the beginning and the end, or at multiple positions within the MAC PDU. In some exemplary embodiments, if there are any padding bytes, the padding may come before the new MAC subheader. If the new MAC subheader is of a fixed size, then parsing from the end of the MAC PDU is also possible. The reference point for the position indication (e.g., as indicated in new MAC subheaders 1120 and 1170) can be from the end of the MAC PDU instead of being from the start of the MAC PDU.

When multiple new MAC subheaders are used in a MAC PDU, the contents of a new MAC subheader can be different from the contents of another MAC subheader in the same MAC PDU. This may be due to their positions in the MAC PDU being different.

Thus, for the NR MAC PDU, the new MAC-subheader including the length of each SDU provides information to the receiver in the partial transmission scheme that allows the receiver to derive the MAC PDU information.

Figure 7:
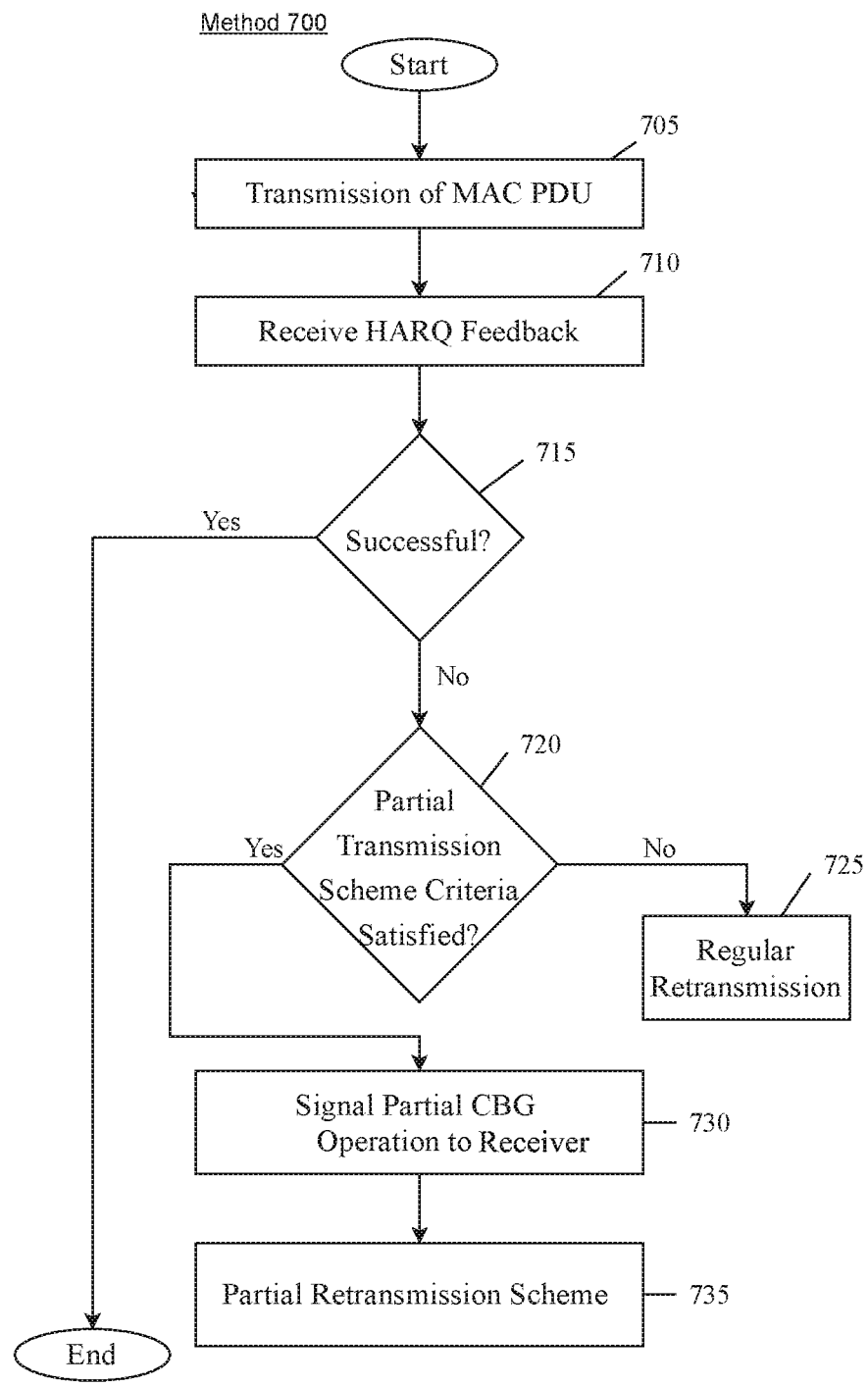
FIG. 7 shows an exemplary call flow method for a transmitting device in a partial transmission scheme according to various exemplary embodiments.

FIG. 7 shows an exemplary call flow method 700 for a transmitting device in a partial transmission scheme according to various exemplary embodiments. As described above, the method 700 will be described with reference to the gNB 120A transmitting the DL MAC PDU 600 to the UE 110. Thus, the operations described in method 700 are described from the standpoint of the gNB 120A. However, the method

700 may also be applied to the UE 110 transmitting the UL MAC PDU 650 to the gNB 120A.

Initially, the gNB 120A sends scheduling information including CBG using Physical Downlink Control Channel (PDCCH) scheduling to the UE 110. In 705, the gNB 120A transmits the DL MAC PDU 600 to the UE 110 on the PDSCH. As will be described in greater detail below, the transmission operation 705 may be an initial transmission or any subsequent retransmission. As part of this PDSCH transmission (or any subsequent PDSCH transmission for the DL MAC PDU 600), the gNB 120A may include a partial transmission table that may be used by the UE 110 for the partial transmission scheme. The partial transmission table may be transmitted to the UE, for example, using Radio Resource Control (RRC) signaling or using a MAC CE. In other exemplary embodiments, the partial transmission table may be provided in a specification or standard. As will be described in greater detail below, the partial transmission table and an indicated entry of the partial transmission table may be used to set up the condition for the receiver's PHY to deliver correctly decoded MAC SDUs or CBGs to the receiver MAC.

The following will provide an example partial transmission table for the DL MAC PDU 600 that will be described with reference to FIG. 6A and FIG. 8. However, it should be understood that the partial transmission table is only an example and other partial transmission tables may be constructed by the gNB 120A based on the specific parameters of the DL MAC PDU for which the table is being constructed, e.g., the number of CBGs, the delay budget of the SDUs in the DL MAC PDU, etc.

Figure 8:
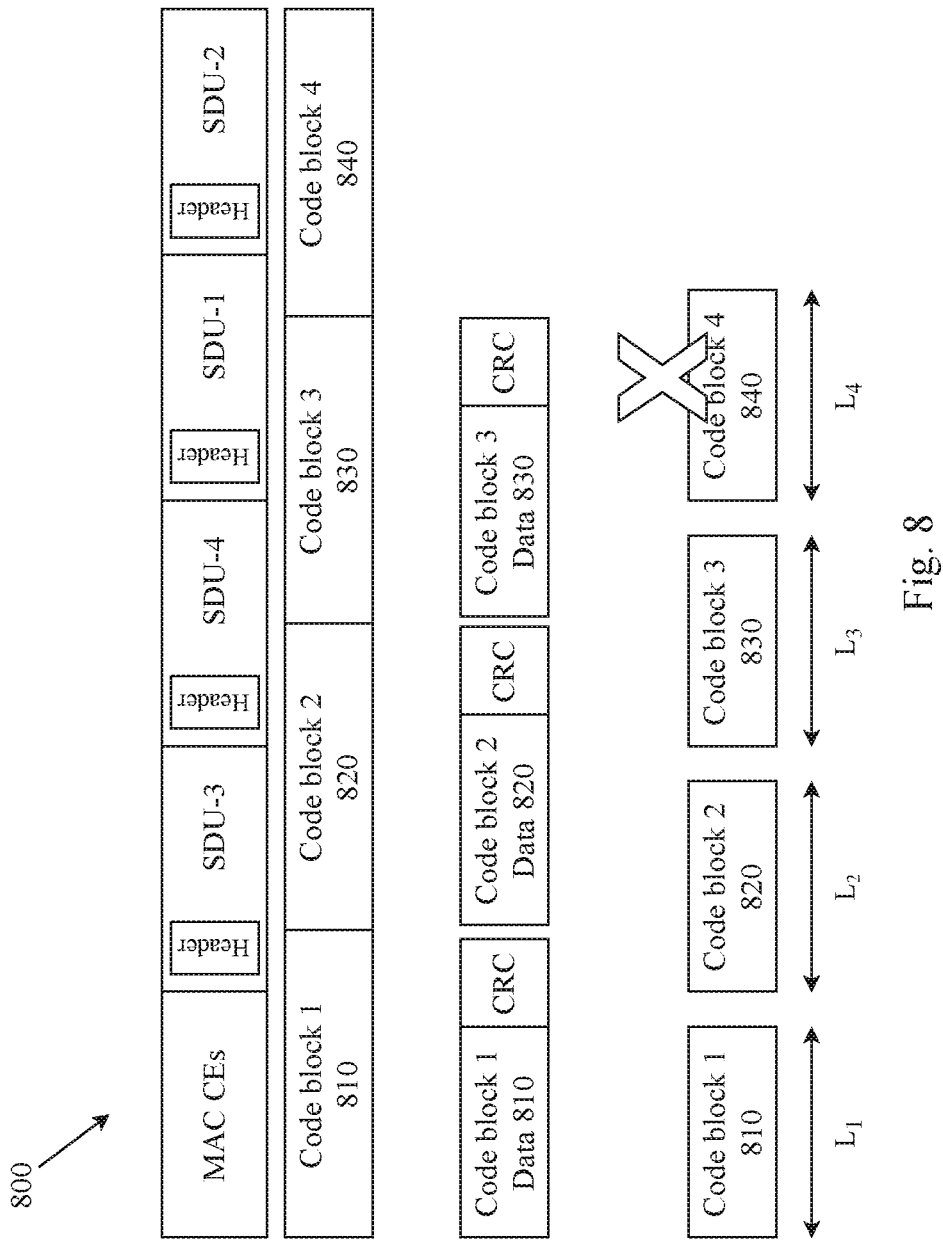
FIG. 8 shows the exemplary NR format for the DL MAC PDU comprising multiple MAC SDUs and divided into a plurality of code blocks of FIG. 6A including additional information according to various exemplary embodiments.

FIG. 8 shows the exemplary NR format for the DL MAC PDU 800 comprising multiple MAC SDUs and divided into a plurality of code blocks of FIG. 6A including additional information according to various exemplary embodiments. The top portion of the DL MAC PDU 800 divided into four code blocks 810-840 and is similar to the DL MAC PDU 600 and will not be described further for purposes of brevity. The code blocks 810-830 show the composition of the first three code blocks (e.g., data plus a CRC). The fourth code block 840 will have the same composition and is not shown to keep the figure uncluttered. In addition, it should be noted that the illustrated lengths of the code blocks in the figures are not drawn to scale and are only exemplary. In addition, FIG. 8 also shows that each of the code blocks 810-840 have a corresponding length.

In the example of FIG. 8, there is an X on the code block 840. This is used to indicate that the code block 840 is the code block that includes a first MAC SDU with the shortest delay budget. As shown in FIG. 6A, the code block 640 includes information for at least two MAC SDUs. The gNB 120A will understand that one of these MAC SDUs has the shortest delay budget and may use this information to construct a partial transmission table for the DL MAC PDU 600. For example, because the code block 640 is the first code block having a delay budget that may expire during the retransmission process, the gNB 120A will understand that this is the first code block that will be omitted during any retransmissions. Thus, the partial transmission table for the DL MAC PDU 600 may be as follows:

| Bitmap | Meaning |
|---|---|
| 01 | Partial transmission [1000] |
| 10 | Partial transmission [1100] |

-continued

| Bitmap | Meaning |
|---|---|
| 11 | Partial transmission [1110] |
| 00 | Regular transmission |

In the example of the DL MAC PDU 600, there are four CBGs. Thus, a two bit bitmap for the partial transmission table may convey the information for the partial transmission scheme. In the example provided above, the bitmap 01 indicates a partial transmission scheme is being used. The bitmap 01 also indicates that the CBG 610 is the only relevant CBG for retransmission, e.g., each of the four CBGs correspond to one of the bits in the pattern in the order presented in the DL MAC PDU 600. Thus, the pattern indicates that CBG 610 is a relevant CBG and may be retransmitted while CBGs 620-640 are not relevant and will not be retransmitted. It should be understood that a relevant CBG is a CBG that includes one or more MAC SDUs where the delay budget has not expired. Thus, when the gNB 120A signals the bitmap 01 based on this exemplary partial transmission table, the gNB 120A is indicating that the CBG 610 is the only relevant CBG and this CBG will be included in the retransmission because there are no other relevant CBGs. The mechanism for the gNB 120A to signal the bitmap 01 will be described in greater detail below.

To continue with the example partial transmission table, the bitmap 10 indicates a partial transmission scheme is being used. The bitmap 10 also indicates that the CBGs 610 and 620 are relevant and may be transmitted in the retransmission, e.g., the pattern indicates that CBG 610 and CBG 620 are relevant while CBGs 630 and 640 will not be retransmitted. Thus, if the gNB 120A signals the bitmap 10 based on this exemplary partial transmission table, the gNB 120A is indicating that the CBG 610 and/or the CBG 620 may be retransmitted. This does not mean that the CBGs 610 and 620 will be retransmitted, just that they may be retransmitted. For example, if the UE 110 has previously successfully received the CBG 610 and indicated this to the gNB 120A, the gNB 120A will not retransmit a CBG that has been successfully transmitted.

The bitmap 11 indicates a partial transmission scheme is being used. The bitmap 11 also indicates that the CBGs 610-630 are relevant, e.g., the pattern indicates that CBG 610, CBG 620 and/or CBG 630 may be retransmitted while CBG 640 will not be retransmitted. Finally, the bitmap 00 indicates that the regular retransmission will be used, e.g., the entirety of the DL MAC PDU 600 will be retransmitted.

As can be seen from the example partial transmission table, since the gNB 120A understands that any partial retransmission will not include CBG 640, the remaining portion of the table can be constructed based on this knowledge.

Returning to the method 700, the UE 110 will receive and process the DL MAC PDU 600 transmitted in 705. In 710, the gNB 120A will receive HARQ feedback to indicate whether the DL MAC PDU 600 has been received successfully by the UE 110. In the exemplary embodiments, the HARQ feedback may follow the CBG based design, e.g., a HARQ feedback bit is dedicated to each CBG. Examples of this CBG based HARQ design will be provided below. In 715, if the transmission is successful, the method 700 is complete because the UE 110 has successfully received the DL MAC PDU 600. However, if the transmission is not successful, the method 700 will continue to potentially use a partial transmission scheme. In this portion of the example, the determination of successful may be based on whether the entire TB including the DL MAC PDU 600 has been received successfully, e.g., the CRC 1250 of TB 1200 passes the CRC check. However, as will be described in greater detail below, when the transmission in 705 is a partial transmission of the DL MAC PDU 600, a successful transmission may be defined in another manner.

In 720, the gNB 120A will determine if any criteria are satisfied that indicate that the partial transmission scheme should be used. For example, one criteria may be that the delay budget of one or more MAC SDUs and/or MAC CEs that are included in the DL MAC PDU 600 have expired. As described above, if one or more of the CBGs includes a MAC SDU with an expired delay budget, there may be no need to retransmit that CBG. In another example, when network resources are limited, the gNB 120A may not have enough radio resources to retransmit all the incorrectly received CBGs. The network may give preferred treatment to MAC SDU (s) with a tighter latency budget, so a partial transmission from the gNB 120A with CBGs containing those MAC SDU (s) and the corresponding partial reception from the UE 110 may be used to allow the UE 110 PHY to deliver MAC SDU (s) with tighter latency budgets to the UE 110 MAC. The gNB 120A may then conduct further transmissions with CBGs containing MAC SDUs that have a more relaxed latency budget. Those skilled in the art will understand that there may be more examples of criteria that may be used to select the partial transmission scheme.

If none of the partial transmission scheme criteria are satisfied, the gNB 120A may then engage in the regular retransmission procedure 725 as was described above, e.g., the entirety of the DL MAC PDU 600 may be retransmitted. The regular retransmission procedure may again start with the transmission of the DL MAC PDU 600 in 705. It should be understood that the method 700 may include operations that are performed multiple times, e.g., the regular retransmission procedure 725 may be performed multiple times.

If the gNB 120A determines that one or more of the partial transmission scheme criteria are satisfied, the gNB 120A may switch to partial CBG operation, e.g., the gNB 120A will use the partial transmission scheme. In 730, the gNB 120A may signal the UE 110 to switch to partial CBG operation. As described above, at some point prior to 730, the UE 110 has received the partial transmission table. The gNB 120A may explicitly signal the UE 110 that the partial CBG operation is being used. For example, the gNB 120A may send the UE 110, via downlink control information (DCI), a trigger to switch to the partial CBG operation. The trigger may be provided in a new field of the DCI, a code state in the DCI, or jointly signaled with other information in a DCI. For example, the trigger may be one of bitmaps included in the exemplary partial transmission table, e.g., 01, 10, 11. When the UE 110 receives one of these bitmaps in the DCI, the UE 110 will understand that partial CBG operation is being used. It should be understood that the gNB 120A may also signal the bitmap 00 in DCI when the regular retransmission 725 is being used. However, in some exemplary embodiments, the UE 110 may assume that regular retransmission 725 is being used unless it is explicitly or implicitly signaled to the UE 110 that the partial CBG operation is being used.

Thus, the operation in 730 may also be an implicit operation, i.e., there is no explicit signaling of a switch to the partial CBG operation between the gNB 120A and the UE 110. For example, as will be described in greater detail below, when the UE 110 sends CBG based HARQ to the gNB 120A, the CBG based HARQ may indicate partial reception of the CBGs of the DL MAC PDU 600 by the UE 110. The gNB 120A may then choose to retransmit only the subset of CBGs that have not been received successfully by the UE 110. Thus, when the UE 110 reports partial reception of the DL MAC PDU 600, the UE 110 may then assume that the gNB 120A will switch to partial CBG operation and retransmit only the CBGs that were reported as unsuccessful in the HARQ feedback. In another exemplary embodiment, the gNB 120A may signal a specific CBG retransmission pattern that indicates to the UE 110 that a partial transmission scheme is being used.

In 735, the gNB 120A may send a partial retransmission of the DL MAC PDU 600 to the UE 110. Examples of partial retransmissions will be described below. However, in general, the partial transmission scheme will transmit the CBGs that have not been received correctly and include MAC SDUs where the delay budget has not expired. In other examples, the partial transmission scheme will transmit the CBGs that have not been received correctly and include the MAC SDUs with the tighter latency budgets. In further examples, the partial retransmission scheme may transmit the CBGs that have not been received correctly and include some or all of the MAC CES.

The partial retransmission scheme may again start with the transmission of the relevant portion of the DL MAC PDU 600 (e.g., the relevant CBGs) in 705. It should be understood that the method 700 may include operations that are performed multiple times, e.g., the partial retransmission procedure 735 may be performed multiple times. In addition, as the method 700 is performed multiple times for the same DL MAC PDU 600, the gNB 120A may switch between the regular retransmission procedure 725 and the partial retransmission procedure 735. For example, even after the gNB 120A has engaged in the partial retransmission procedure 735, the gNB 120A may select to perform the regular retransmission procedure 725. In other words, even if one or more of the partial retransmission criteria are satisfied in 720, the gNB 120A is not required to perform the partial retransmission procedure 735.

When the gNB 120A is performing the partial retransmission procedure 735, the determination of successful (715) may be based on whether the relevant portion of the DL MAC PDU 600 has been received successfully. For example, if the TB including the DL MAC PDU 600 has been divided into four (4) CBGs and three (3) of the four (4) CBGs have been determined to be relevant, the successful delivery of the three (3) relevant CBGs may be considered a successful transmission when performing the partial transmission scheme.

Figure 13:
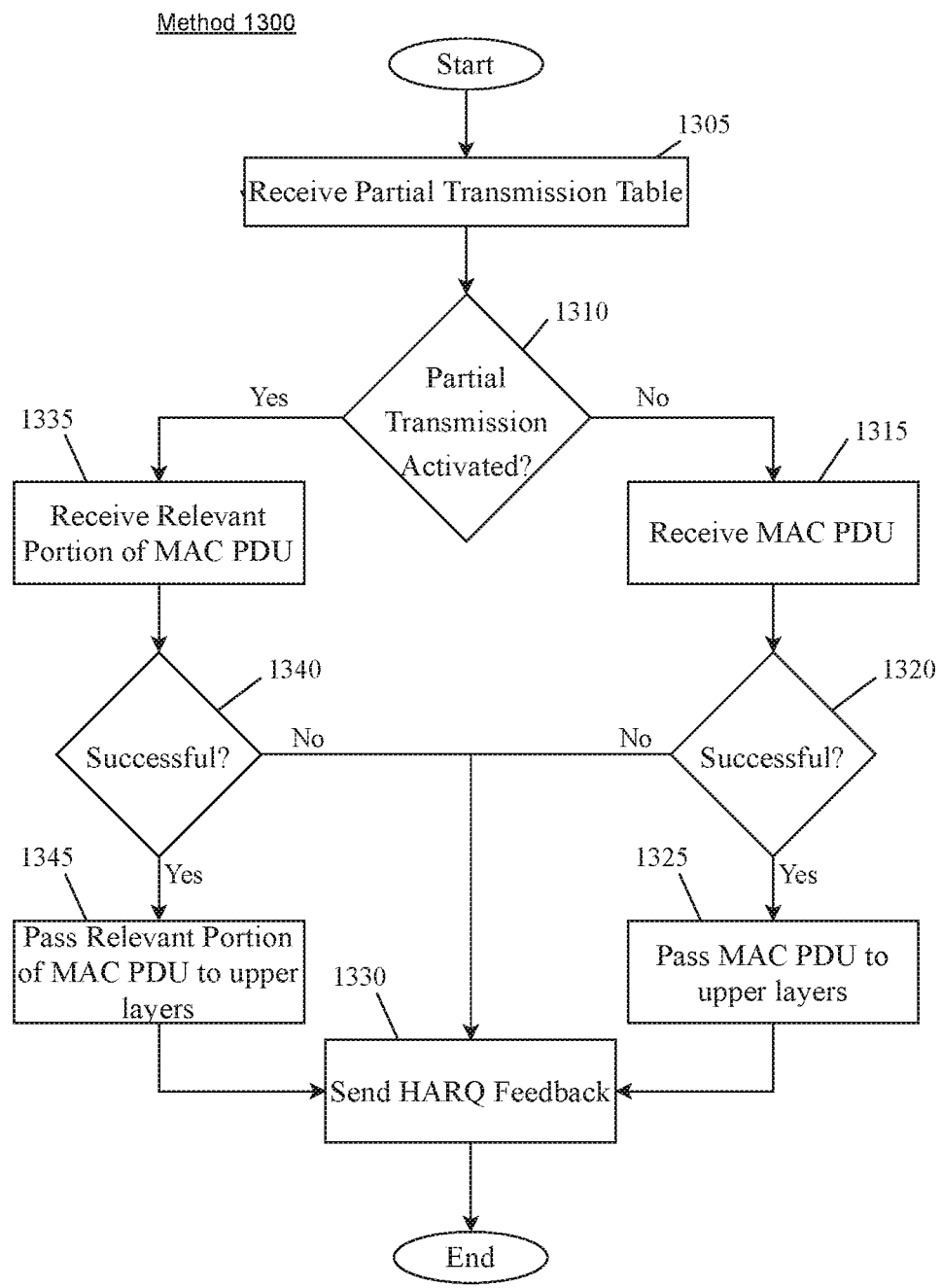
FIG. 13 shows an exemplary call flow method for a receiving device in a partial transmission scheme according to various exemplary embodiments.

FIG. 13 shows an exemplary call flow method 1300 for a receiving device in a partial transmission scheme according to various exemplary embodiments. The method 1300 will be described with reference to the gNB 120A transmitting the DL MAC PDU 600 to the UE 110. Thus, the operations described in method 1300 are described from the standpoint of the UE 110. However, the method 1300 may also be applied to the UE 110 transmitting the UL MAC PDU 650 to the gNB 120A, e.g., where the gNB 120A is the receiving device.

Initially, as described above, the gNB 120A sends scheduling information including CBG using PDCCH scheduling to the UE 110. In 1305, as part of a PDSCH transmission, the UE 110 may receive the partial transmission table that may be used by the UE 110 for the partial transmission scheme. The partial transmission table may be transmitted to the UE 110, for example, using Radio Resource Control (RRC) signaling or using a MAC CE. In other exemplary embodiments, the partial transmission table may be provided in a specification or standard. The UE 110 may receive the partial transmission table in an original PDSCH transmission or any subsequent PDSCH transmission.

In 1310, the UE 110 determines whether the partial transmission scheme is activated. As described above, the trigger for activating the partial transmission scheme may be explicit (e.g., via the gNB 120A signaling the UE 110) or implicit. As the manners of activating the partial transmission scheme were described above, this will not be repeated here.

If the partial transmission scheme is not activated, the UE 110 will expect that the gNB 120A will be performing regular retransmission operations. Thus, in 1315 the UE 110 will expect to receive a retransmission for the entire DL MAC PDU 600. In 1320, the UE 110 will determine whether the entire TB including the DL MAC PDU 600 has been received successfully, e.g., the CRC 1250 of TB 1200 passes the CRC check.

If the TB including the DL MAC PDU 600 has been received successfully, in 1325, the UE 110 PHY may pass the TB including the DL MAC PDU 600 to the UE 110 MAC for further processing. In 1330, the UE 110 may transmit HARQ feedback to the gNB 120A indicating the successful transmission. If, in 1320, it is determined that the TB including the DL MAC PDU 600 has not been received successfully, the UE 110, in 1330, may transmit HARQ feedback to the gNB 120A indicating the unsuccessful transmission.

When it is determined in 1310 that the partial transmission scheme is activated, UE 110 will expect that the gNB 120A will be performing partial retransmission operations. In 1335, the UE 110 will receive the relevant portions of the DL MAC PDU 600. Examples of the relevant portions will be provided below.

In 1340, the UE 110 will determine whether the partial retransmission of the DL MAC PDU 600 has been received successfully. As described above, successful receipt of a partial transmission includes successfully receiving the relevant CBGs. As was also described above, the relevant CBGs may be defined in the partial transmission table entries. The UE 110 will receive an indication of the specific entry in the partial transmission table that is being used for this partial transmission. The UE 110 will then determine if the UE 110 has successfully received all the relevant CBGs based on the partial transmission table entry. Successful receipt of a CBG includes all the code blocks in the CBG passing the CRC check.

If the partial retransmission is successful, the UE the UE 110 PHY may pass the relevant CBGs including portions of the DL MAC PDU 600 to the UE 110 MAC for further processing. In 1330, the UE 110 may transmit HARQ feedback to the gNB 120A indicating the successful partial retransmission. If, in 1340, it is determined that the partial transmission of the DL MAC PDU 600 has not been received successfully, the UE 110, in 1330, may transmit HARQ feedback to the gNB 120A indicating the unsuccessful partial retransmission.

While FIGS. 7 and 13 provided general methods 700 and 1300 for transmitting/retransmitting and receiving the DL MAC PDU 600, the following will provide some specific examples of the methods 700 and 1300 being applied to the DL MAC PDU 600. Prior to describing the examples, there is some additional information concerning the DL MAC PDU 600 that may be used for the purposes of the partial transmission scheme. First, as described above, according to some exemplary embodiments, the new MAC subheader may be introduced and included in the DL MAC PDU 600. The new MAC subheader may include various information about each of the MAC subPDUs such as the length of each MAC subPDU, e.g., the lengths shown for the code blocks 810-840 in FIG. 8. This information may be used to skip the processing of some MAC subPDUs because the UE 110 will have the exact location of each MAC subPDU in the DL MAC PDU 600 or the UE 110 will have the exact location of some MAC subPDU (s) in the DL MAC PDU 600 and the lengths of each MAC subPDU which may be used to determine the starting location of each MAC subPDU.

However, the method 700 does not require the use of the new MAC subheader, e.g., the method 700 may be performed without modification to the DL MAC PDU 600. Without the new MAC sub-header, following the current NR design, contiguous MAC SDUS in a MAC PDU need to be parsed by the receiver one by one. If there is any gap in received MAC PDU, then the receiver may encounter problem as it does not know where to look for the start of a MAC SDU. Thus, to perform the partial transmission scheme without the new MAC subheader, there may be a preferred ordering of the SDUs in the DL MAC PDU 600. Since the MAC subheader for each MAC subPDU does not provide information as to the size of each SDU, the MAC should receive all non-expired SDUs in sequence, e.g., the SDUs should be placed in priority order within the DL MAC PDU 600 from longest delay budget to shortest delay budget. An example of this can be seen in the DL MAC PDU 600, where the SDUs are ordered as SDU-3, SDU-4, SDU-1 and SDU-2. Thus, from this order it can be inferred that the delay budget for the SDU-2 will expire first, the delay budget for the SDU-1 will expire second, etc. This ordering may be beneficial for the example where the partial transmission scheme is based on the delay budget expiration. However, for the example where the partial transmission scheme is based on retransmitting the MAC SDUs having the tighter latency budgets, the ordering may be the exact opposite, e.g., from shortest delay budget to longest delay budget. Since it is not possible to order the DL MAC PDU 600 for both examples, the examples without the new MAC subheader may have to predetermine which example should be treated by the partial transmission scheme.

In a first example, it may be considered that the gNB 120A transmitted the DL MAC PDU 600 to the UE 110 in 705. The gNB 120A also transmitted the example partial transmission table to the UE 110. In this first example, it may be considered that the UE 110 only received the CBG 610 and CBG 630 of the DL MAC PDU 600. The UE 110 will then transmit HARQ feedback to the gNB 120A in the form that indicates, in order, CBG 610 was received successfully, CBG 620 was not received successfully, CBG 630 was received successfully and CBG 640 was not received successfully. Thus, the gNB 120A will determine that the DL MAC PDU 600 transmission was not successful (715). In this first example, it may be considered that the delay budget for the SDU-2 that is included in the CBG 640 has expired (720). Thus, the gNB 120A may determine to go into partial CBG operation, e.g., there is no need to retransmit CBG 640.

As described above, the gNB 120A may explicitly transmit the switch indication to the UE 110 via DCI. In this example, since CBGs 610-630 still include SDUs where the delay budget has not expired, the gNB 120A may signal (730) the UE 110 with the bitmap 11 corresponding to the partial transmission operation with three relevant CBGs (e.g., Partial transmission) [1110]). As described above, the switch to partial CBG operation (730) may be implicit based on the HARQ feedback of the UE 110, e.g., since the UE 110 signaled that some CBGs were received incorrectly, the UE 110 will assume that the gNB 120A will move into the partial CBG operation. As also described above, the implicit switch may be when a specific CBG retransmission pattern is indicated. In this case, the gNB 120A will transmit the retransmission pattern to the UE 110 to indicate the partial retransmission will include the CBG 620. This retransmission pattern may be transmitted via the DCI. Again, this transmission pattern that only includes one CBG may implicitly inform the UE 110 to switch to the partial transmission scheme.

To provide some context, the bitmap that is from the partial transmission table based on the signaling in the DCI indicates to the UE the relevant CBGs, e.g., the CBGs that include SDUs having delay budgets that have not expired. This information may be used by the UE 110 PHY layer to pass to the UE 110 MAC so the upper level layer (MAC) will understand that at least one SDUs within the CBG 840 has expired. The retransmission pattern that may also be signaled in the DCI is an indication of the actual CBGs that will be retransmitted in the next retransmission, e.g., in this example the CBG 620. This information may be used by the UE 110 PHY to associate the information in the retransmission with the correct CBG for processing. As described above, because the UE 110 may not have the lengths of each MAC SDU, the UE 110 is signaled as to the CBG (s) that are being received in the retransmission. If the new MAC subheader (as will be described below) is used, then the retransmission pattern may not be transmitted because the UE 110 may use the lengths of the CBG (s) (or MAC SDU (s)) to process the retransmission.

The gNB 120A will then retransmit the CBG 620 (735), e.g., the relevant CBG that was not successfully received. As described above, the UE 110 will receive the retransmission pattern will understand that the partial transmission will be the CBG 620. The UE 110 will process the retransmission and, in this example, it may be considered that the CBG 620 was received correctly. The UE 110 may then send further HARQ feedback to the gNB 120A, e.g., [1110], indicating that the partial transmission was successful, e.g., the relevant CBGs 610-630 have been successfully received by the UE 110. The gNB 120A will then consider this transmission of the DL MAC PDU 600 successful (715) and the operations of the gNB 120A with respect to DL MAC PDU 600 will be complete.

After successfully receiving the CBG 620, the UE 110 PHY will have the CBGs 610-630 that have passed the CRC check. As described above, when in partial operation, the PHY may pass the CBGs that have passed the CRC to the MAC, e.g., in this example CBGs 610-630. The PHY may also pass the bitmap corresponding to the relevant CBGs to the MAC. This may be performed because the MAC may then parse the forwarded CBGs to extract MAC SDUs and/or MAC CEs/MAC subheaders/etc. For example, the UE 110 MAC may identify if there are any SDUs that have expired delay budgets and avoid passing those SDU's to higher layers. In this example, the CBGs 610-630 include the complete SDU-3 and SDU-4. Thus, these SDUs will be passed by the MAC to the higher layers for additional processing.

In a second example, it may be considered to be similar to the first example. However, when the gNB 120A retransmits the CBG 620 in the partial transmission scheme, it may be considered that the UE 110 does not successfully receive the CBG 620. Thus, the UE 110 will once again report the HARQ feedback indicating that the UE 110 did not successfully receive the CBG 620. In this second example, the UE 110 may once again report the cumulative HARQ feedback of because CBGs 610 and 630 have been received successfully but CBGs 620 and 640 have not been received successfully. Alternatively, the UE 110 may report an instant HARQ feedback of indicating that the UE 110 did not successfully receive the CBG 620 that was retransmitted using the partial retransmission scheme, e.g., the instant HARQ feedback only pertains to the CBGs in the partial retransmission. The gNB 120A will receive this HARQ feedback and will attempt to retransmit the CBG 620 according to the partial transmission scheme. It should be understood that this assumes that the delay budget of the SDUs included in CBG 620 have not expired. If the UE 110 successfully receives the CBG 620 in the second retransmission, then the operations as described above for successful receipt will be performed. This second example shows that the gNB 120A may perform multiple recursive operations of the method 700 to attempt to successfully transmit the complete or partial DL MAC PDU 600.

In a third example, it may be considered that the gNB 120A transmitted the DL MAC PDU 600 to the UE 110 in 705. The gNB 120A also transmitted the example partial transmission table to the UE 110. In this first example, it may be considered that the UE 110 received the CBG 610, CBG 630 and the CBG 640 of the DL MAC PDU 600. The UE 110 will then transmit HARQ feedback to the gNB 120A in the form that indicates, in order, CBG 610 was received successfully, CBG 620 was not received successfully, CBG 630 was received successfully and CBG 640 was received successfully. Thus, the gNB 120A will determine that the DL MAC PDU 600 transmission was not successful (715). In this third example, it may be considered that the delay budget for the SDU-2 that is included in the CBG 640 has expired (720). Thus, the gNB 120A may determine to go into partial CBG operation.

As described above, the gNB 120A may explicitly transmit the switch indication to the UE 110 via DCI or implicitly signal the switch. The gNB 120A will then retransmit the CBG 620 (735), e.g., the relevant CBG that was not successfully received. The UE 110 will process the retransmission and, in this example, it may be considered that the CBG 620 was received correctly. The UE 110 may then send further HARQ feedback to the gNB 120A indicating that the partial transmission was successful. The gNB 120A will then consider this transmission of the DL MAC PDU 600 successful (715) and the operations of the gNB 120A with respect to DL MAC PDU 600 will be complete.

The UE 110 after successfully receiving the CBG 620, e.g., the PHY will have the CBGs 610-640 that have passed the CRC check. However, as described above, the CBG 640 is no longer relevant. The PHY understands this because the PHY is aware of the bitmap corresponding to the relevant CBGs based on the partial transmission table and the DCI. In this third example, in one option the PHY may deliver only the relevant CBGs to the MAC, e.g., CBGs 610-640). In a second option, the PHY may deliver all the successfully received CBGs to the MAC regardless of the status of the budget delay of the SDUs. In the second option, the MAC may sort out the SDUs based on expired budget delays.

In the above examples, when describing the partial transmission scheme, it was described that the transmitting device only retransmitted the relevant CBGs. However, that is not a requirement of the exemplary embodiments. For example, consider the scenario where there are four (4) CBGs for the TB including the MAC PDU. In addition, there is a separate MAC SDU in each CBG, and each is associated with a separate latency budget. The transmitter may initially target regular HARQ transmission for all four (4) CBGs. When the latency budget for MAC SDU-1 (e.g., consider MAC SDU-1 is enclosed in CBG-2 is exceeded, the transmitter can omit the transmission of the CBG-2 and indicate to the receiver PHY by excluding the CBG-2 in the prescribed CBGs for partial reception, e.g., through signaling the entry from the partial transmission table, where "0" is for CBG-2. The receiver may then ignore the decoding status of the CBG-2 when delivering partial reception to the receiver MAC. However, the transmitter also has the choice to actually retransmit the CBG-2 but still indicate the relevant CBGs do not include the CBG-2. Thus, the entry to the partial transmission table sets a target for the receiver PHY to meet so the receiver PHY can deliver the partial transmission to the receiver MAC. During the progress of the HARQ transmission, the transmitter may find the MAC SDU-2 latency budget (assume MAC SDU-2 is enclosed in CBG 3) is also exceeded. The transmitter may then signal the entry from the partial transmission table so that the target for partial transmission is modified. Thus, the disclosed approach allows the transmitter to adapt the target for the receiver PHY delivery of partial transmissions from the transmitter to receiver MAC. The transmitter also has the choice not to vary the target, e.g., the indicated entry to the partial transmission table with the progress of HARQ transmission. In some exemplary embodiments, the transmitter may decide that only one CBG, e.g., CBG-1 should be retransmitted because it may include MAC CEs. In such a case, the entry such as may be used. For NR uplink, as MAC CEs are placed at the end of the MAC PDU, then the last CBG (s) may be the target for partial transmission. Other uses may be also supported by the disclosed approach.

Figure 9:
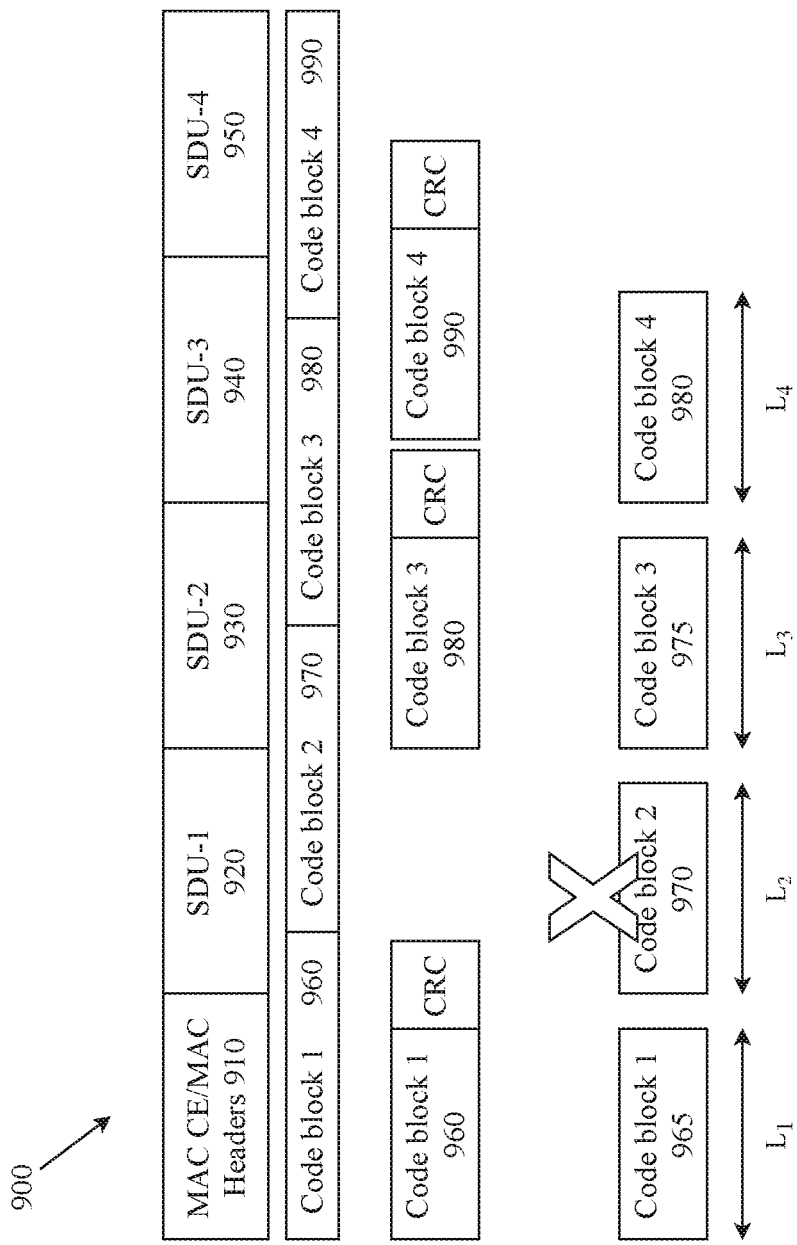
FIG. 9 shows the exemplary LTE format for the MAC PDU comprising multiple MAC SDUs and divided into a plurality of code blocks including additional information according to various exemplary embodiments.

As described above, the previous examples were related to MAC PDUs having an NR format. The method 700 of FIG. 7 may also be applied to MAC PDUs having the LTE format. FIG. 9 shows the exemplary LTE format for the MAC PDU 900 comprising multiple MAC SDUs and divided into a plurality of code blocks including additional information according to various exemplary embodiments. The top portion of the MAC PDU 900 comprises the MAC CE and MAC Headers 910 and the SDUs 920-950. These components were described above with reference to FIG. 5. Similar to the NR format, the MAC PDU 900 is divided into a plurality of the code blocks, e.g., code blocks 960-990. The code block groups may encompass more than one MAC subPDU. For example, the code block 960 includes the MAC CE/MAC header subPDUs and a portion of the first MAC subPDU that includes a first MAC SDU, the code block 970 includes the remaining portion of the first MAC SDU and a portion of the second MAC SDU, etc.

The code blocks 960, 980, 990 show the composition of the three code blocks (e.g., data plus a CRC). The fourth code block 970 will have the same composition and is not shown to keep the figure uncluttered. In addition, it should be noted that the illustrated lengths of the code blocks in the figures are not drawn to scale and are only exemplary. In addition, FIG. 9 also shows that the data portion of each of the code blocks 960-990 have a corresponding length.

In the example of FIG. 9, there is an X on the code block 970. This is used to indicate that the code block 970 is the code block that includes a first SDU with the shortest delay budget. The code block 970 includes information for at least two SDUs. The base station will understand that one of these SDUs has the shortest delay budget and may use this information to construct a partial transmission table for the MAC PDU 900. For example, because the code block 970 is the first code block having a delay budget that may expire during the retransmission process, the base station will understand that this is the first code block that will be omitted during any retransmissions. Similar to the example described above, the base station may use this information to construct a partial transmission table for the MAC PDU 900. The partial transmission table for the MAC PDU 900 may be as follows:

| Bitmap | Meaning |
| --- | --- |
| 01 | Partial transmission [1011] |
| 10 | Partial transmission [1001] |
| 11 | Partial transmission [1010] |
| 00 | Regular transmission |

In the example of the DL MAC PDU 900, there are four CBGs. Thus, a two bit bitmap for the partial transmission table may convey the information for the partial transmission scheme. In the example provided above, the bitmap 01 indicates a partial transmission scheme is being used. The bitmap 01 also indicates that the CBGs 960, 980 and 990 relevant CBGs for retransmission, e.g., the pattern [1011]. The bitmap 10 indicates a partial transmission scheme is being used. The bitmap 10 also indicates that the CBGs 660 and 690 are relevant and may be transmitted in the retransmission, e.g., the pattern [1001]. The bitmap 11 indicates a partial transmission scheme is being used. The bitmap 11 also indicates that the CBGs 660 and 680 are relevant, e.g., the pattern [1010]. Finally, the bitmap 00 indicates that the regular retransmission will be used, e.g., the entirety of the MAC PDU 900 will be retransmitted.

While the exemplary embodiments of the partial transmission table have been described as including two bits for signaling the partial transmission scheme, those skilled in the art will understand that more bits may be used. For example, additional bits may be used for arbitrarily ordered SDUs. This may allow for additional flexibility when using the partial transmission scheme.

Unlike the NR MAC PDU format, in the LTE PDU format, the MAC header has the size of each SDU. This size information may be used to allow the UE 110 to skip to specific code blocks and/or SDUs. Thus, in some exemplary embodiments, the CBG that includes the MAC header may include more robust encoding to ensure that the MAC header information is received by the UE.

The following will provide some specific examples of the method 700 being applied to the MAC PDU 900. Again, the examples will be described as a base station transmitting the MAC PDU 900 to the UE 110. However, it should be understood that the same examples apply equally to the UE 110 transmitting the MAC PDU 900 to the base station.

In a first example, it may be considered that the base station transmitted the MAC PDU 900 to the UE 110 in 705. The base station also transmitted the example partial transmission table to the UE 110. In this first example, it may be considered that the UE 110 received the CBG 960 and CBG 980 of the MAC PDU 900. The UE 110 will then transmit HARQ feedback to the base station in the form that indicates, in order, CBG 960 was received successfully, CBG 970 was not received successfully, CBG 980 was received successfully and CBG 990 was not received successfully. Thus, the base station will determine that the MAC PDU 900 transmission was not successful (715). In this first example, it may be considered that the delay budget for the SDU-1 that is included in the CBG 970 has expired (720). Thus, the base station may determine to go into partial CBG operation, e.g., there is no need to retransmit CBG 970.

As described above, the base station may explicitly transmit the switch indication to the UE 110 via DCI. In this example, since CBGs 960, 980 and 990 still include SDUs where the delay budget has not expired, the base station may signal (730) the UE 110 with the bitmap 01 corresponding to the partial transmission operation with three relevant CBGs (e.g., Partial transmission [1011]). As described above, the switch to partial CBG operation (730) may be implicit based on the HARQ feedback of the UE 110, e.g., since the UE 110 signaled that some CBGs were received incorrectly, the UE 110 will assume that the base station will move into the partial CBG operation.

The base station will then retransmit the CBG 990 (735), e.g., the relevant CBG that was not successfully received, and a CBG indication [0001]. As described above, since the UE 110 sends the HARQ feedback, e.g., [1011], the UE 110 understands that CBG 970 and CBG 990 of the MAC PDU 900 were not received correctly. The UE 110 also understands from the partial transmission table and the DCI that the CBG 970 is no longer relevant. Thus, based on this information and the CBG indication [0001], the UE 110 will understand that the partial transmission will be the CBG 990 because it was not received correctly and it is still relevant. The UE 110 will process the retransmission and, in this example, it may be considered that the CBG 990 was received correctly. The UE 110 may then send further HARQ feedback to the base station, e.g., [1011], indicating that the partial transmission was successful. The base station will then consider this transmission of the MAC PDU 900 successful (715) and the operations of the base station with respect to MAC PDU 900 will be complete.

The UE 110 after successfully receiving the CBG 990, e.g., the PHY will have the CBGs 960, 980 and 990 that have passed the CRC check. As described above, when in partial operation, the PHY may pass the CBGs that have passed the CRC checking for all the CBs in a CBG to the MAC. The PHY may also pass the bitmap corresponding to the relevant CBGs to the MAC and the lengths of each of the code blocks. Using this information, the MAC can deduce the SDU-3 and SDU-4 are received completely, and deliver them to the higher layers.

Based on the above first example of the MAC PDU 900 and the above scenarios described for the second and third examples of the DL MAC PDU 600, those skilled in the art will understand the operation of the base station and the UE with respect to the scenarios described for the second and third examples are applied to the MAC PDU 900.

From the above examples, it may be seen that the partial transmission table and the indicated entry from the transmitter (e.g., gNB 120A) in the partial transmission table allow the receiver PHY (e.g., UE 110 PHY) to deliver the partial reception of the MAC PDU to the receiver UE MAC when the UE PHY determines that the CBs in the relevant CBGs pass their respective CB CRC checking. The transmitter becomes aware of the receiver PHY delivery of the partial reception of the MAC PDU to the receiver MAC through the HARQ feedback which is provided by the receiver. The receiver PHY or transmitter PHY may then reset the soft buffer or data buffer for the HARQ process for the transport block with the MAC PDU. In other words, the partial transmission table and the referred entry prescribes the relevant one or more CBGs which should be received correctly by the UE PHY. When all the relevant CBGs from the referred entry in the partial transmission table are received correctly by the receiver PHY, the receiver PHY delivers those correctly received CBGs to receiver MAC. In some exemplary embodiments, other correctly received CBGs that are not relevant based on the referred entry may be also delivered to the UE MAC.

In other exemplary embodiments, both the transmitter and receiver know the composition of the MAC PDU, and the receiver knows the size of each MAC SDU. When the delay budget of a MAC SDU is exceeded, then the transmitter will not include the MAC SDU in the HARQ retransmission. As long as the receiver receives the MAC SDUs which have not expired, the receiver can deliver the correctly received SDUs to the upper layers. Thus, these exemplary embodiments also present a partial transmission scheme. However, unlike the examples provided above, the partial transmission scheme is not related to the CBGs but are related to individual subPDUs.

In some exemplary embodiments, the PDU-composition and/or the SDU-composition may be signaled by dynamic signaling by the transmitter to the receiver. For example, in the DL, the PDU composition may be indicated in the PDCCH. In other exemplary embodiments, new fields in the DCI may be used. In the UL, the PDU composition may be indicated in uplink control information (UCI) indication within the PUSCH. In other exemplary embodiments, the PDU composition may be transmitted over the PUCCH, which serves as an indicator similar to PDCCH in the downlink.

If all the SDUs are coded using the same MCS, a single link adaptation operation may be conducted. However, the partial transmission scheme allows termination of the transmission for some SDUs. In some exemplary embodiments, separate outer loop link adaptation (OLLA) operations may be used if SDUs have different coding rates or different modulation orders.

In these exemplary embodiments, the receiver may be signaled as to the SDUs that are being omitted in the retransmission. For example, for the LTE MAC PDU 500, a bitmap (e.g., one bit for each SDU) or code state encoding scheme may be dynamically signaled, e.g., in DCI or UCI depending on the direction of the transmission. Then, when a partial retransmission is used, a CRC may be applied to each SDU. If the SDU specific CRC is passed, the PHY of the receiver can deliver the SDU to the upper layer.

The process for implementing the partial transmission scheme for the exemplary embodiments is the same as described above with reference to FIG. 7. The only difference is that the partial transmission table, the HARQ feedback, etc., is based on the subPDUs rather than the CBGs.

As described above, in these exemplary embodiments, the receiver is signaled with information including the PDU composition and the lengths of the SDUs in the PDU. There is an overhead associated with this signaling. Some exemplary embodiments reduce this signaling overhead through the use of various techniques. For example, in some exemplary embodiments, the selected SDU size is not arbitrary, but is rather a multiple of X Bytes, e.g., X>=1, 2, 3, 4, etc., with padding.

In some exemplary embodiments, the SDUs are sorted in size order. For example, [Size of SDU m]>=[Size of SDU n] if SDU m is placed earlier than SDU n in the MAC PDU, e.g., larger SDUs are placed first in the MAC PDU. This allows the encoding of sizes of SDUs more efficiently than with arbitrarily placed SDUs. In some exemplary embodiments, limited combinations are supported according to the size of the MAC PDU. The combinations or limit on the size of the MAC PDU may be represented by a table that can be RRC configured or signaled by MAC CE or {RRC configured and selected by MAC CE}. For example, the RRC configuration or MAC CE signaling may indicate a combination table such as, for example, [8, 4, 2, 1], [8, 2, 2, 1]. A single bit may then be to select the entry.

Similarly, there is a signaling overhead associated with the retransmission. Some exemplary embodiments reduce this signaling overhead through the use of various techniques. For example, SDU placement may be according to factors considering latency or importance, e.g., only earlier/later placed SDUs in a MAC PDU may be eligible for retransmission. In some exemplary embodiments, if one bit is used to represent a SDU, then omission patterns such as [0001], [0011], may be used (e.g. "0" for omission). In other exemplary embodiments, the MAC header may contain useful information for SDU composition, so omission may not be supported for the first part of the MAC PDU, e.g., [1001], [1011], may be used.

In still further exemplary embodiments, based on HARQ feedback, the gNB 120A may issue a "flush" command so UE 110 PHY can deliver the successfully decoded CBGs to UE 110 MAC. Thus, like the above exemplary embodiments, the MAC PDUs may be divided into CBGs. However, as will be described below, these exemplary embodiments do not use a partial transmission scheme.

Figure 10:
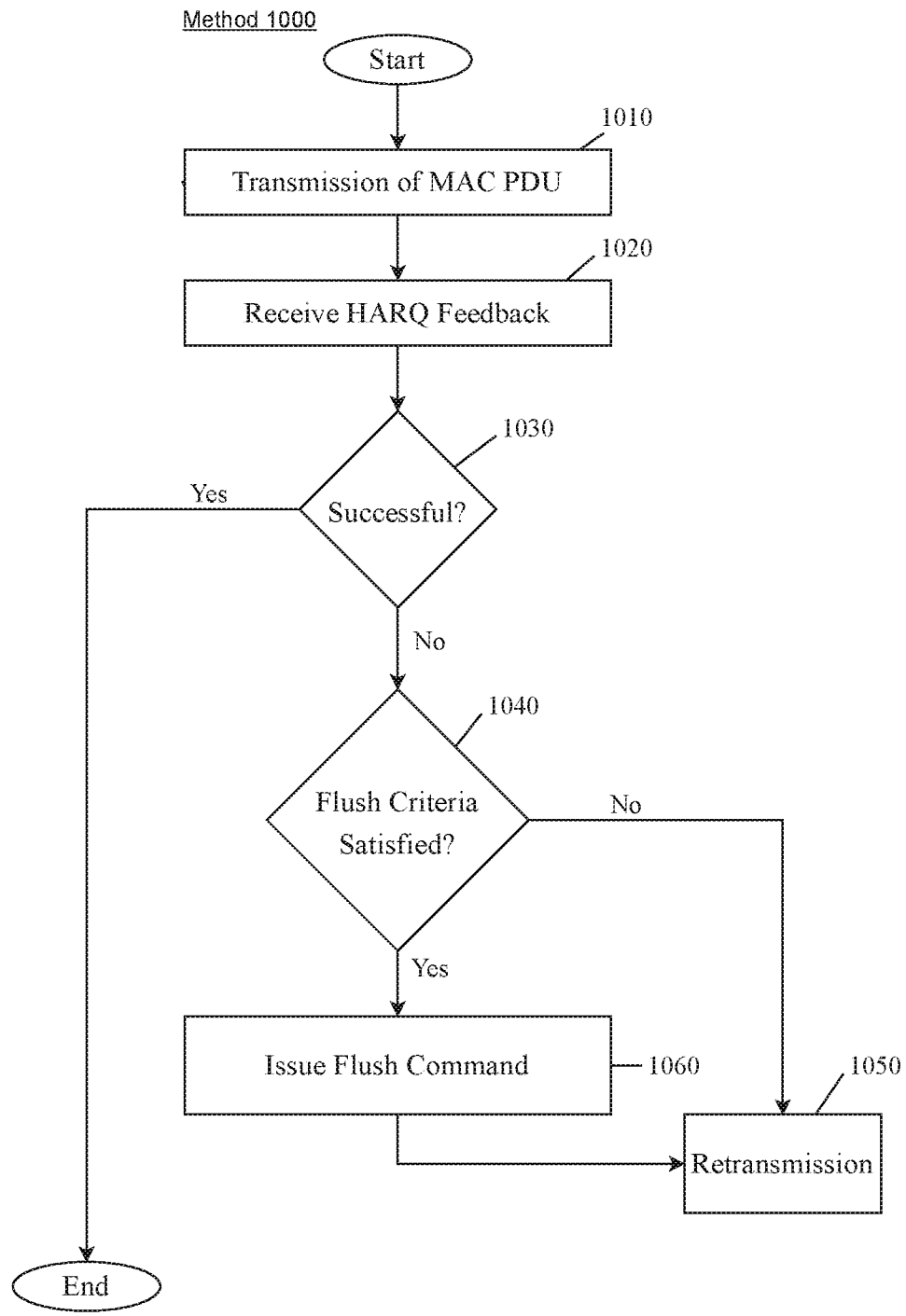
FIG. 10 shows an exemplary call flow method 1000 for a retransmission scheme comprising a flush command according to various exemplary embodiments.

FIG. 10 shows an exemplary call flow method 1000 for a retransmission scheme comprising a flush command according to various exemplary embodiments. The method 1000 will be described with reference to the gNB 120A transmitting the DL MAC PDU 600 to the UE 110. Thus, the operations described in method 1000 are described from the standpoint of the gNB 120A. However, the method 1000 may also be applied to the UE 110 transmitting the UL MAC PDU 650 to the gNB 120A or either the gNB 120A or the UE 110 transmitting the MAC PDU 900.

Initially, the gNB 120A sends scheduling information including CBG using Physical Downlink Control Channel (PDCCH) scheduling to the UE 110. In 1010, the gNB 120A transmits the DL MAC PDU 600 to the UE 110 on the PDSCH. The UE 110 will receive and process the DL MAC PDU 600 transmitted in 1010. In 1020, the gNB 120A will receive HARQ feedback to indicate whether the DL MAC PDU 600 has been received successfully by the UE 110. In the exemplary embodiments, the HARQ feedback may follow the CBG based design, e.g., a HARQ feedback bit is dedicated to each CBG. In 1030, if the transmission is successful, the method 1000 is complete because the UE 110 has successfully received the DL MAC PDU 600. However, if the transmission is not successful, the method 1000 will continue.

In 1040, the gNB 120A will determine if any of the flush criteria are satisfied. Again, similar to the partial transmission scheme criteria, the flushing criteria may be, for example, the delay budget of one or more of the MAC SDUs that are included in the DL MAC PDU 600 have expired. As described above, if one or more of the CBGs includes an SDU with an expired delay budget, there is no need to retransmit that CBG. In another example similar to the partial transmission scheme criteria, when the network resources are limited, the gNB 120A may not have enough radio resources to retransmit all the CBGS which are not correctly received by the UE. The network can give preferential treatment for the MAC SDU (s) with a tighter latency budget.

If the flush criteria are not satisfied, the gNB 120A may then engage in a retransmission operation 1050. In some exemplary embodiments, the retransmission operation may be a regular retransmission procedure as was described above, e.g., the entirety of the DL MAC PDU 600 may be retransmitted. In other exemplary embodiments, the retransmission operation may be a partial retransmission procedure as was described above, e.g., only the CBGs that have been received incorrectly are retransmitted. It should be understood that the method 1000 may include operations that are performed multiple times, e.g., if a retransmission is to occur, the method 1000 may start again with the transmission of the DL MAC PDU 600 in 1010 (partial or full retransmission).

If the gNB 120A determines that one or more of the flush criteria are satisfied, the gNB 120A may determine that the UE 110 PHY should deliver the subset of the correctly received CBGs to the UE 110 MAC. For example, after one or more rounds of transmission/retransmission, the UE may report in HARQ feedback that CBGs 610 and 620 of the DL MAC PDU 600 have been received correctly. In 1060, the gNB issues a flush command in, for example, dynamic signaling (e.g., 1 bit or a code state for flush in DCI). The UE 110 PHY receives the flush command and delivers the successfully decoded CBGs to UE 110 MAC, e.g., in this example CBGs 610 and 620. Similar to the partial transmission scheme described above, the UE 110 PHY may ignore the TB CRC. After the flush command, the gNB 120A may again perform a retransmission operation 1050, e.g., either partial or full retransmission based on a selection by the gNB 120A.

In NR design, MAC CE (s) may be used in configuration, activation or de-activation of resources such as those for CSI measurement, TCI states, TCI States Activation/Deactivation for UE-specific PDSCH, TCI State Indication for UE-specific PDCCH, Enhanced PUCCH Spatial Relation Activation/Deactivation, Enhanced SP/AP SRS Spatial Relation Indication, etc. as provided in Clause 6.1.3 of TS 38.212. In some cases, the time for indication from a MAC CE to take effect is determined according to the HARQ-ACK feedback time. Thus, in some exemplary embodiments that support partial transmission, if the CBG (s) containing the full MAC CE are delivered by the UE PHY to the UE MAC, then the corresponding HARQ-ACK feedback may be used to determine the time when the MAC CE's indication takes effect.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a first device configured to perform operations comprising:
   generating, for transmission to a second device, a medium access control (MAC) protocol data unit (PDU) comprising a plurality of MAC subPDUs, each MAC subPDU comprising at least one of a subheader, a MAC service data unit (SDU) or a MAC control element (CE);
   receiving, from the second device, feedback indicating that the MAC PDU was received incorrectly;
   determining that a partial transmission scheme criteria is satisfied;
   generating, for transmission to the second device, an indication that the partial transmission scheme is to be used to retransmit the MAC PDU;
   generating, for retransmission to the second device, the MAC PDU using the partial transmission scheme; and
   generating, for transmission to the second device, a partial transmission table, wherein the partial transmission table is constructed based on, at least, a delay budget for one of the MAC SDUs or MAC CEs in the MAC PDU.

2. The processor of claim 1, wherein
   the partial transmission table comprises information related to a partial retransmission scheme for the MAC PDU.

3. The processor of claim 1, wherein the indication is transmitted in one of downlink control information (DCI) when the MAC PDU is being transmitted in a downlink (DL) or uplink control information (UCI) when the MAC PDU is being transmitted in an uplink (UL).

4. The processor of claim 1, wherein the indication comprises an entry in the partial transmission table, wherein the entry comprises a second indication of one or more portions of the MAC PDU that are relevant.

5. The processor of claim 4, wherein the partial transmission scheme includes retransmitting at least one of the relevant portions of the MAC PDU.

6. The processor of claim 4, wherein the relevant portions of the MAC PDU comprise portions to be passed from a physical (PHY) layer of a receiver to a MAC layer of the receiver when less than an entirety of the MAC PDU is received correctly by the receiver.

7. The processor of claim 1, wherein the MAC PDU is divided into a plurality of code block groups (CBGs).

8. The processor of claim 7, wherein the MAC PDU comprises one or more subheaders that include a starting position of at least one MAC subPDU in the MAC PDU.

9. The processor of claim 1, wherein the partial transmission scheme criteria comprises whether one or more of the MAC subPDUs or MAC CEs have an expired delay budget.

10. The processor of claim 1, wherein the partial transmission scheme criteria comprises whether one or more of the MAC subPDUs or MAC CEs are prioritized based on a latency requirement.

11. The processor of claim 1, wherein the MAC PDU comprises one of a New Radio (NR) downlink (DL) MAC PDU that is transmitted in a Physical Downlink Shared Channel (PDSCH) or an NR uplink (UL) MAC PDU that is transmitted in a Physical Uplink Shared Channel (PUSCH).

12. A processor of a first device configured to perform operations comprising:
   receiving, from a second device, a medium access control (MAC) protocol data unit (PDU) comprising a plurality of MAC subPDUs, each MAC subPDU comprising at least one of a subheader, a MAC service data unit (SDU) or a MAC control element (CE);
   receiving, from the second device, an indication that a partial transmission scheme is to be used to retransmit the MAC PDU;
   receiving, from the second device, a retransmission of the MAC PDU according to the partial retransmission scheme; and
   receiving, from the second device, a partial transmission table, wherein the partial transmission table is constructed based on, at least, a delay budget for one of the MAC SDUs or MAC CEs in the MAC PDU.

13. The processor of claim 12, wherein the indication is received in one of downlink control information (DCI) when the MAC PDU is being received in a downlink (DL) or a uplink control information (UCI) when the MAC PDU is being received in an uplink (UL).

14. The processor of claim 12, wherein the partial transmission table comprises information related to a partial retransmission scheme for the MAC PDU.

15. The processor of claim 13, wherein the indication comprises an entry in the partial transmission table, wherein the entry comprises a second indication of one or more portions of the MAC PDU that are relevant, the operations further comprising:
   when the one or more portions of the MAC PDU that are relevant are received correctly, passing from a physical layer (PHY) of the first device to an upper level layer of the first device the one or more portions of the MAC PDU that are identified as relevant.

16. The processor of claim 12, wherein the MAC PDU is divided into a plurality of code block groups (CBGs).

17. The processor of claim 16, wherein each of the CBGs comprise one or more code blocks and each of the code blocks includes cyclic redundancy check (CRC) bits and the operations further comprise:
   performing a CRC check on each of the code blocks, wherein the CRC check is successful for a CBG when each of the code blocks in the CRC passes the CRC check.

18. The processor of claim 12, wherein the MAC PDU comprises one or more subheaders that include a starting position of at least one MAC subPDU in the MAC PDU.

19. A processor of a first device configured to perform operations comprising:
   generating, for transmission to a second device, a transport block comprising a plurality of control block groups (CBGs), wherein the CBGs comprise a portion of one or more medium access control (MAC) sub Protocol Data Units (subPDUs) or MAC control element (CE);

receiving, from the second device, feedback indicating that at least some of the CBGs of the TB were received incorrectly;

determining that a flush criteria has been satisfied;

generating, for transmission to the second device, a flush command indicating that one or more of the CBGs that were received correctly is to be passed to an upper layer of the second device; and generating, for transmission to the second device, a partial transmission table, wherein the partial transmission table is constructed based on, at least, a delay budget for one of the MAC subPDUs.

\* \* \* \* \*